(12) United States Patent
Li et al.

(10) Patent No.: US 12,481,349 B2
(45) Date of Patent: Nov. 25, 2025

(54) SYSTEMS AND METHODS OF ESTIMATING POWER FOR THERMAL MANAGEMENT IN POWER-CONSTRAINED DEVICES

(71) Applicant: Meta Platforms Technologies, LLC, Menlo Park, CA (US)

(72) Inventors: Ding Li, Fremont, CA (US); Rahul Srivastava, Santa Clara, CA (US); Sumeet Kumar Lnu, San Jose, CA (US); Siddharth Ray, Sunnyvale, CA (US); Neelakantan Nurani Krishnan, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 164 days.

(21) Appl. No.: 18/427,152

(22) Filed: Jan. 30, 2024

(65) Prior Publication Data

US 2024/0302886 A1 Sep. 12, 2024

Related U.S. Application Data

(60) Provisional application No. 63/451,386, filed on Mar. 10, 2023.

(51) Int. Cl.
G06F 1/32 (2019.01)
G06F 1/3287 (2019.01)

(52) U.S. Cl.
CPC .................. *G06F 1/3287* (2013.01)

(58) Field of Classification Search
CPC .................................. G06F 1/3287
See application file for complete search history.

(56) References Cited

U.S. PATENT DOCUMENTS

| | | | |
|---|---|---|---|
| 2007/0037548 A1* | 2/2007 | Sammour | H04W 52/0235 455/343.2 |
| 2016/0330689 A1* | 11/2016 | Park | H04W 52/0216 |
| 2017/0332327 A1* | 11/2017 | Fang | H04L 5/0007 |

\* cited by examiner

*Primary Examiner* — Stefan Stoynov
(74) *Attorney, Agent, or Firm* — Foley & Lardner LLP

(57) ABSTRACT

A system may include one or more processors. The one or more processors may be configured to obtain, from a device configured to perform communication in a wireless local area network (WLAN), a transmission (Tx) time for which the device is transmitting one or more signals during a period of time, a receive (Rx) time for which the device is receiving one or more signals during the period of time, and/or a listen time for which the device is in a listen state during the period of time. The one or more processors may be configured to estimate, based at least on the Tx time, the Rx time and the listen time, an average power consumption value of the device during the period of time. The one or more processors may be configured to control the device based at least on the average power consumption value.

20 Claims, 18 Drawing Sheets

SYSTEMS AND METHODS OF ESTIMATING POWER FOR THERMAL MANAGEMENT IN POWER-CONSTRAINED DEVICES

CROSS-REFERENCE TO RELATED APPLICATION

This application claims priority to U.S. Provisional Patent Application No. 63/451,386, filed Mar. 10, 2023, which is incorporated by reference in its entirety for all purposes.

FIELD OF DISCLOSURE

The present disclosure is generally related to controlling power consumption of devices, including but not limited to systems and methods for estimating average power consumption of a battery-powered device, and/or performing power/thermal mitigation based on changes of power consumption of subsystems.

BACKGROUND

Artificial reality such as virtual reality (VR), augmented reality (AR), or mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a console communicatively coupled to the HWD. In some embodiments, the console may have access to a network.

SUMMARY

Various embodiments disclosed herein are related to a system including one or more processors. In some embodiments, the one or more processors may be configured to obtain, from a device configured to perform communication in a wireless local area network (WLAN), a transmission (Tx) time for which the device is transmitting one or more signals during a period of time, a receive (Rx) time for which the device is receiving one or more signals during the period of time, and a listen time for which the device is in a listen state (e.g., signal monitoring mode) during the period of time. The one or more processors may be configured to estimate, based at least on the Tx time, the Rx time and the listen time, an average power consumption value of the device during the period of time. The one or more processors may be configured to control the device based at least on the average power consumption value.

In some embodiments, the Tx time, the Rx time and the listen time are a total Tx time, a total Rx time and a total listen time, during the period of time, respectively. In some embodiments, in estimating the average power consumption value of the device during the period of time, the one or more processors may be configured to obtain a Tx power consumption value of the device in a Tx state, an Rx power consumption value of the device in an Rx state, and/or a listen power consumption value of the device in the listen state. The one or more processors may be configured to multiply the Tx time, the Rx time and the listen time by the Tx power consumption value, the Rx power consumption value and/or the listen power consumption value, respectively. The one or more processors may be configured to obtain the Tx power consumption value based on at least one of a Tx power level, a channel bandwidth, a modulation-and-coding scheme (MCS) index, or a number of spatial streams (NSS). The one or more processors may be configured to obtain the Rx power consumption value based on at least one of the channel bandwidth, or the NSS. The one or more processors may be configured to obtain the listen power consumption value based on the channel bandwidth.

In some embodiments, the one or more processors may be configured to obtain, from the device, a sleep time for which the device is in a power-save state during the period of time. The one or more processors may be configured to estimate, based at least on the Tx time, the Rx time, the listen time and the sleep time, the average power consumption value of the device during the period of time.

In some embodiments, the one or more processors may be configured to periodically obtain, from the device, a Tx time, an Rx time and a listen time. The one or more processors may be configured to estimate, based at least on the Tx time, the Rx time and the listen time periodically obtained from the device, an average power consumption value of the device.

In some embodiments, in controlling the device, the one or more processors may be configured to compare the average power consumption with a threshold. The one or more processors may be configured to perform, according to a result of the comparing, a mitigation action on the device to reduce power consumption of the device. The mitigation action may include at least one of throttling an application data rate, throttling a traffic rate, reducing a radio Tx power, or notifying a user of the device to move closer to an access point.

In some embodiments, in controlling the device, the one or more processors may be configured to estimate, according to a temperature of the device during the period of time, a power budget of the device. The one or more processors may be configured to calculate, based on the power budget and the estimated average power consumption value, a current power excess (PE) value. The one or more processors may be configured to obtain a previous PE value and a previous mitigation value indicating a degree of reducing power consumption of the device. The one or more processors may be configured to calculate a current mitigation value based at least on the current PE value, the previous PE value, and the previous mitigation value. The one or more processors may be configured to perform, according to the current mitigation value, a mitigation action on the device to reduce power consumption of the device. In calculating the current mitigation value, responsive to determining that the current PE value is greater than 0 and the previous mitigation value is smaller than a predetermined mitigation value, the one or more processors may be configured to calculate the current mitigation value by adding a first value to the previous mitigation value. Responsive to determining that the current PE value is smaller than 0 and the previous mitigation value is greater than 0, the one or more processors may be configured to calculate the current mitigation value by subtracting the first value from the previous mitigation value. The first value may indicate reducing power consumption of the device by a scaling constant times the current PE value.

Various embodiments disclosed herein are related to a method including obtaining, by one or more processors from a device configured to perform communication in a wireless local area network (WLAN), a transmission (Tx) time for which the device is transmitting one or more signals during a period of time, a receive (Rx) time for which the device is receiving one or more signals during the period of time, and a listen time for which the device is in a listen state during the period of time. The method may include estimating, by the one or more processors based at least on the Tx time, the Rx time and the listen time, an average power consumption value of the device during the period of time. The method may include controlling, by the one or more processors, the device based at least on the average power consumption value.

In some embodiments, the Tx time, the Rx time and the listen time may be a total Tx time, a total Rx time and a total listen time, during the period of time, respectively. In some embodiments, in estimating the average power consumption value of the device during the period of time, the one or more processors may obtain a Tx power consumption value of the device in a Tx state, an Rx power consumption value of the device in an Rx state, and a listen power consumption value of the device in the listen state. The one or more processors may multiply the Tx time, the Rx time and the listen time by the Tx power consumption value, the Rx power consumption value and the listen power consumption value, respectively. The one or more processors may obtain the Tx power consumption value based on at least one of a Tx power level, a channel bandwidth, a modulation-and-coding scheme (MCS) index, or a number of spatial streams (NSS). The one or more processors may obtain the Rx power consumption value based on at least one of the channel bandwidth, or the NSS. The one or more processors may obtain the listen power consumption value based on the channel bandwidth.

In some embodiments, the one or more processors may obtain, from the device, a sleep time for which the device is in a power-save state during the period of time. The one or more processors may estimate, based at least on the Tx time, the Rx time, the listen time and the sleep time, the average power consumption value of the device during the period of time.

In some embodiments, the one or more processors may periodically obtain, from the device, a Tx time, an Rx time and a listen time. The one or more processors may estimate, based at least on the Tx time, the Rx time and the listen time periodically obtained from the device, an average power consumption value of the device.

In some embodiments, in controlling the device, the one or more processors may compare the average power consumption with a threshold. The one or more processors may perform, according to a result of the comparing, a mitigation action on the device to reduce power consumption of the device. The mitigation action may include at least one of throttling an application data rate, throttling a traffic rate, reducing a radio Tx power, or notifying a user of the device to move closer to an access point.

In some embodiments, in controlling the device, the one or more processors may estimate, according to a temperature of the device during the period of time, a power budget of the device. The one or more processors may calculate, based on the power budget and the estimated average power consumption value, a current power excess (PE) value. The one or more processors may obtain a previous PE value and a previous mitigation value indicating a degree of reducing power consumption of the device. The one or more processors may calculate a current mitigation value based at least on the current PE value, the previous PE value, and the previous mitigation value. The one or more processors may perform, according to the current mitigation value, a mitigation action on the device to reduce power consumption of the device. In calculating the current mitigation value, responsive to determining that the current PE value is greater than 0 and the previous mitigation value is smaller than a predetermined mitigation value, the one or more processors may calculate the current mitigation value by adding a first value to the previous mitigation value. Responsive to determining that the current PE value is smaller than 0 and the previous mitigation value is greater than 0, the one or more processors may calculate the current mitigation value by subtracting the first value from the previous mitigation value. The first value may indicate reducing power consumption of the device by a scaling constant times the current PE value.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

1. Managing Power Consumption of Device Subsystems

Figure 1:
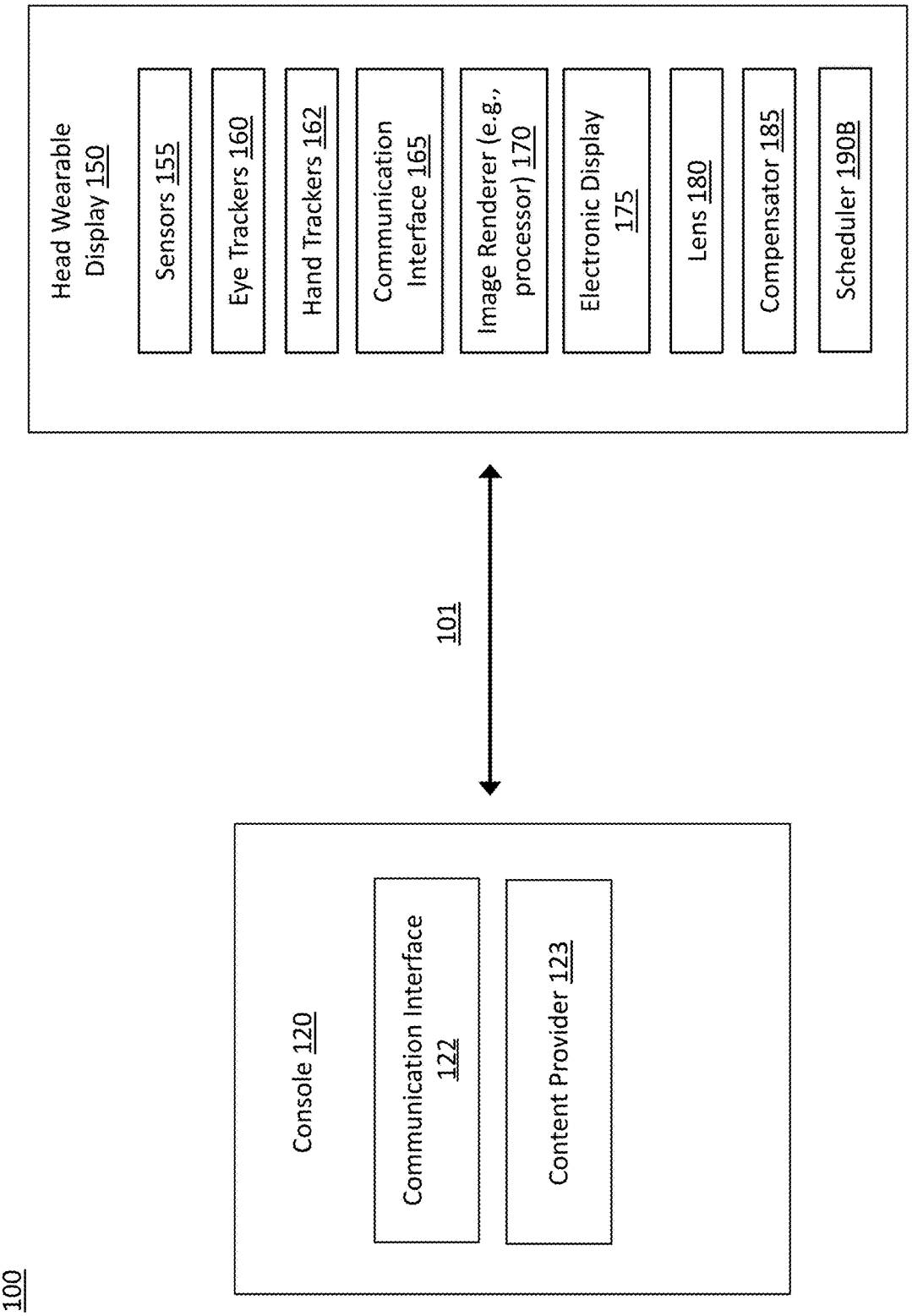
FIG. 1 is a diagram of a system environment including an artificial reality system, according to an example implementation of the present disclosure.

FIG. 1 is a block diagram of an example artificial reality system environment 100 in which a console 120 operates. FIG. 1 provides an example environment in which devices may communicate traffic streams with different latency sensitivities/requirements. In some embodiments, the artificial reality system environment 100 includes a HWD 150 worn by a user, and a console 120 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the console 120 through a wired or wireless connection. The HWD 150 may also identify objects (e.g., body, hand face).

The console 120 may determine a view within the space of the artificial reality corresponding to the detected location, orientation and/or the gaze direction, and generate an image depicting the determined view. The console 120 may also receive one or more user inputs and modify the image according to the user inputs. The console 120 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 120 may be performed by the HWD 150, and/or some of the functionality of the HWD 150 may be performed by the console 120.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 120, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 120 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 120. The communication interface 165 may communicate with a communication interface 122 of the console 120 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 120 and the head wearable display 150 are implemented on a single system, the communication interface 165 may communicate with the console 120 through a bus connection or a conductive trace. Through the communication link, the communication interface 165 may transmit to the console 120 sensor measurements indicating the determined location of the HWD 150, orientation of the HWD 150, the determined gaze direction of the user, and/or hand tracking measurements. Moreover, through the communication link, the communication interface 165 may receive from the console 120 sensor measurements indicating or corresponding to an image to be rendered.

Using the communication interface, the console 120 (or HWD 150) may coordinate operations on link 101 to reduce collisions or interferences. For example, the console 120 may coordinate communication between the console 120 and the HWD 150. In some implementations, the console 120 may transmit a beacon frame periodically to announce/advertise a presence of a wireless link between the console 120 and the HWD 150 (or between two HWDs). In an implementation, the HWD 150 may monitor for or receive the beacon frame from the console 120, and can schedule communication with the HWD 150 (e.g., using the information in the beacon frame, such as an offset value) to avoid collision or interference with communication between the console 120 and/or HWD 150 and other devices.

The console 120 and HWD 150 may communicate using link 101 (e.g., intralink). Data (e.g., a traffic stream) may flow in a direction on link 101. For example, the console 120 may communicate using a downlink (DL) communication to the HWD 150 and the HWD 150 may communicate using an uplink (UL) communication to the console 120.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 120 may be encoded, and the image renderer 170 may decode the data to generate and render the image. In one aspect, the image renderer 170 receives the encoded image from the console 120, and decodes the encoded image, such that a communication bandwidth between the console 120 and the HWD 150 can be reduced.

In some embodiments, the image renderer 170 receives, from the console 120, additional data including object information indicating virtual objects in the artificial reality space and depth information indicating depth (or distances from the HWD 150) of the virtual objects. Accordingly, the image renderer 170 may receive from the console 120 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 120, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 120 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 120 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 120 is an electronic component or a combination of an electronic component and a software component that provides content to be rendered to the HWD 150. In one aspect, the console 120 includes a communication interface 122 and a content provider 123. These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view. In other embodiments, the console 120 includes more, fewer, or different components than shown in FIG. 1. In some embodiments, the console 120 is integrated as part of the HWD 150. In some embodiments, the communication interface 122 is an electronic component or a combination of an electronic component and a software component that communicates with the HWD 150. The communication interface 122 may be a counterpart component to the communication interface 165 to communicate with a communication interface 122 of the console 120 through a communication link (e.g., USB cable, a wireless link). Through the communication link, the communication interface 122 may receive from the HWD 150 sensor measurements indicating the determined location and/or orientation of the HWD 150, the determined gaze direction of the user, and/or hand tracking measurements. Moreover, through the communication link, the communication interface 122 may transmit to the HWD 150 data describing an image to be rendered.

The content provider 123 can include or correspond to a component that generates content to be rendered according to the location and/or orientation of the HWD 150, the gaze direction of the user and/or hand tracking measurements. In one aspect, the content provider 123 determines a view of the artificial reality according to the location and orientation of the HWD 150 and/or the gaze direction of the user of the HWD 150. For example, the content provider 123 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 123 may generate image data describing an image of the determined view of the artificial reality space, and transmit the image data to the HWD 150 through the communication interface 122. The content provider may also generate a hand model (or other virtual object) corresponding to a hand of the user according to the hand tracking measurement, and generate hand model data indicating a shape, a location, and an orientation of the hand model in the artificial reality space.

In some embodiments, the content provider 123 generates metadata including motion vector information, depth information, edge information, object information, etc., associated with the image, and transmits the metadata with the image data to the HWD 150 through the communication interface 122. The content provider 123 may encode and/or encode the data describing the image, and can transmit the encoded and/or encoded data to the HWD 150. In some embodiments, the content provider 123 generates and provides the image to the HWD 150 periodically (e.g., every one second).

Figure 2:
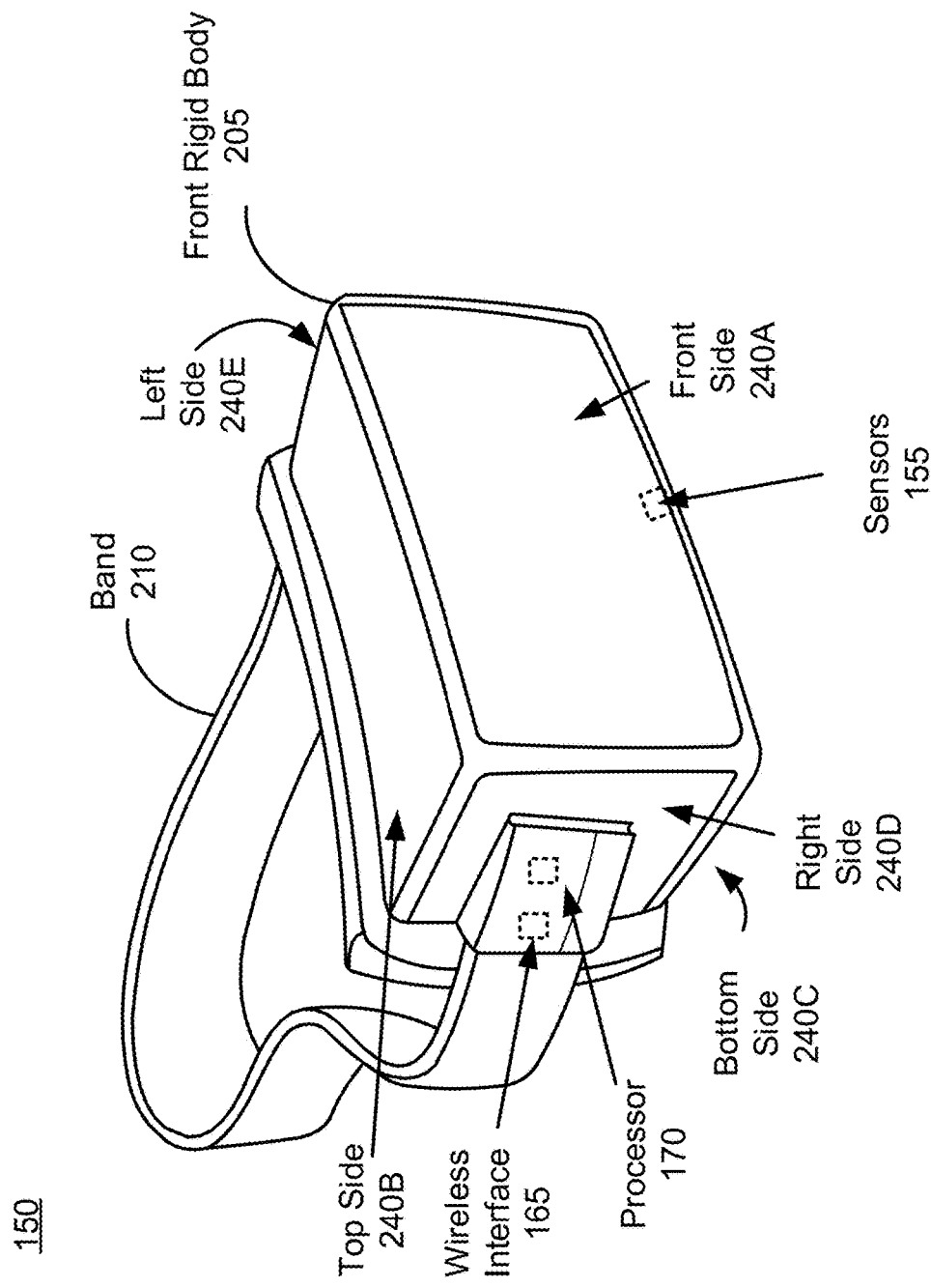
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
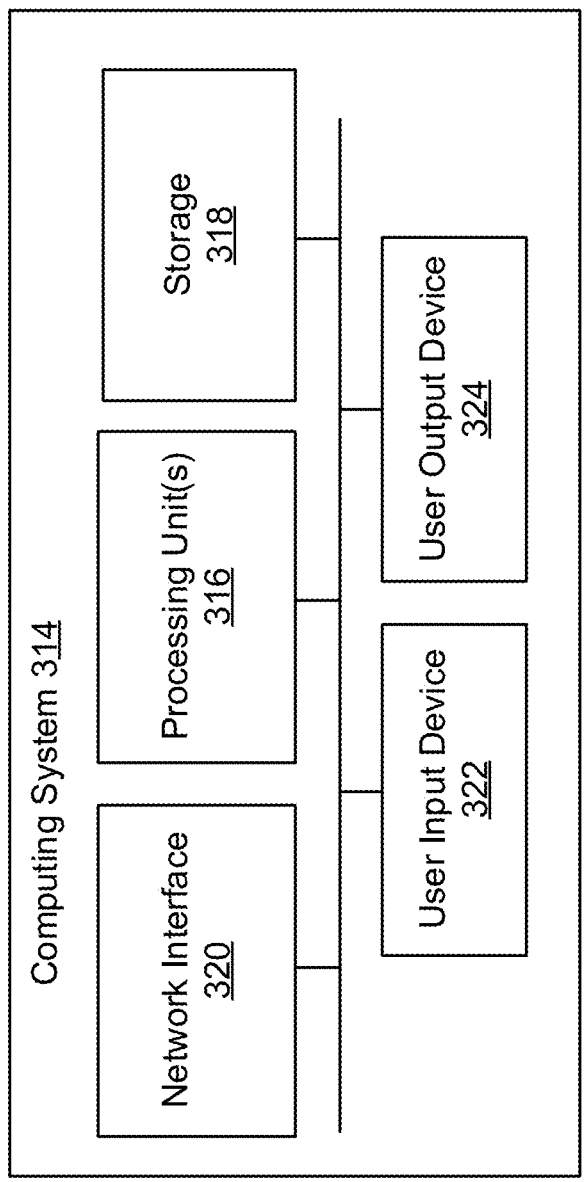
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 120, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHZ, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
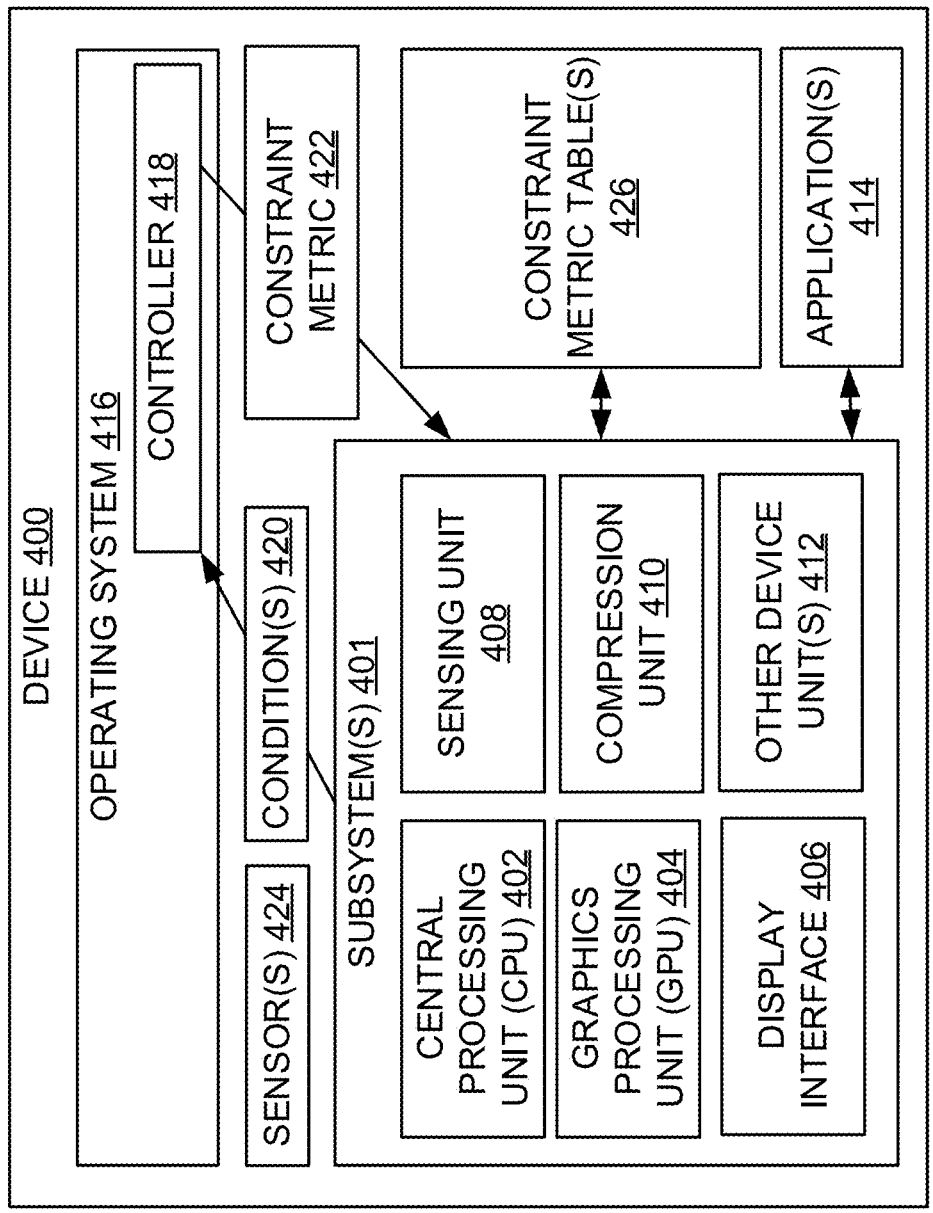
FIG. 4 is a block diagram of a device, according to an example implementation of the present disclosure.

Referring now to FIG. 4, depicted is a device 400, according to an example implementation of the present disclosure. The device 400 is shown to include various device units or subsystems 401 (e.g., processing/functional units/blocks/components), including a central processing unit (CPU) 402, a graphics processing unit (GPU) 404, a display interface 406, a sensing unit 408, a compression unit 410, and/or various other units 412, such as a camera unit, an I/O unit, decoders/encoders, and/or other processing units of the device. In use, each of the device units may consume power at various rates and amounts/levels, which may depend on the particular application 414 or resource being accessed on the device 400. For example, during a video call or conference using a corresponding application 414, some units/subsystems 401 (such as the display interface 406, camera unit, a communication unit, and GPU 404) may consume more power than other units or subsystems 401 (such as the sensing unit 406, I/O unit, etc.), based on functions or tasks which are to be performed by those units 401. As another example, while the device 400 is executing a local gaming application 414, some units/subsystem 401 (such as the display interface 406, CPU 402, GPU 404, sensing unit 408) may consume more power than other units or subsystems 401 (such as the compression unit 410, decoders/encoders, etc.).

Some devices may include hardware controller(s) which monitor thermal or power consumption levels of the device. Where the thermal or power consumption levels increase too rapidly or exceed a threshold, the hardware controller(s) may universally reduce power consumption across each of the device subsystems. For example, the hardware controller(s) may reduce or throttle overall power consumption of the device (e.g., by 20%) such that each of the device subsystems reduce their power consumption by 20%. The hardware controller(s) may function as a protective measure against device damage (e.g., due to thermal output of the device/overheating, burnout, etc.). However, by universally reducing power consumption across each of the device subsystems, user experience may be reduced, as overall device performance is degraded.

According to the systems and methods of the present solution, the device 400 may be configured to maintain one or more constraint metric tables 426 for applications 414 executable on or supported by the device. The constraint metric tables 426 may be configured to specify power levels for the subsystems 401 of the device 400 according to a respective application 414 or application type of the application 414 which is executing on the device 400. The device 400 may be configured to determine to operate the device 400 at a reduced power level for a first application 414 based on a condition 420 of the device 400 satisfying a thermal threshold criteria or power threshold criteria when the device 400 operates at a full level. The device 400 may apply a constraint metric 422 responsive to determining to operate at the reduced power level. By applying the constraint metric, at least a subset of the plurality of subsystems 401 may be configured to adjust a power consumption level of the subsystem 401 according to a first constraint metric table 426 corresponding to (or configured/established for) the first application 414.

As shown in FIG. 5, the device 400 may include an operating system (OS) 416. The operating system 416 may be or include system-level software deployed or otherwise executing on the device 404 that manages device hardware, software, and/or provides services of the device 400. In some embodiments, the operating system 416 may include/execute a controller 418. The controller 418 may be a part of the operating system 416 or may include/comprise the operating system 416. In other words, the controller 418 may be the processors/processing components/hardware which deploys or otherwise executes the operating system 416. The controller 418 may be configured to execute instructions from memory of the device 400 to provide the operating system 416. The controller 418 may be configured to execute instructions as part of providing the operating system 416, to manage power consumption at the subsystem 401 level.

The device 400 may include one or more sensor(s) 424. The sensor(s) 424 may be or include any device, component, element, or hardware configured to sense, monitor, measure, detect, or otherwise identify various condition(s) 420 of the device 400. The sensor(s) 424 may be configured to identify conditions 420 of the device 400 as subsystems 401 execute on the device 400 or otherwise perform functions for the device 400. The sensor(s) 424 may include temperature sensor(s) 424 (such as a thermometer) configured to identify a temperature or thermal condition/level of the device 400. The sensor(s) 424 may include power sensor(s) (such as a power meter, current sensor, configured to identify a power consumption condition of the device 400. The power consumption condition may include total (e.g., aggregate) power, average power, etc. of the device 400 across some or all of the subsystems 401 of the device 400.

The device 400 may be configured to execute one or more applications 414. The device 400 may be configured to execute one or more application(s) 414 responsive to a user request (e.g., to an I/O unit or subsystem of the device 400) which selects/activates an icon corresponding to the application 414 or otherwise launches the application 414. The device 400 may be configured to execute different types of applications 414. For example, the device 400 may be configured to execute video/audio streaming applications 414, video/audio conferencing applications 414, gaming applications 414, messaging applications 414, data storage applications 414, and so forth. In some embodiments, each application 414 may include or otherwise maintain information which indicates an application type for the application 414. For example, the applications 414 may be tagged (e.g., by an app developer) with their application type. When a user of the device 400 installs, deploys, or otherwise executes the application 414 on the device 400, the device 400 may be configured to determine an application type for the application 414.

The controller 418 may be configured to receive, identify, or otherwise determine the condition 420 (e.g., temperature or thermal condition/level, application speed/response/latency, battery/power level, average/peak power consumption level/rate) of the device 400. The controller 418 may be configured to determine the condition 420 of the device 400 based on sensor data from the sensor(s) 424 of the device 400. The controller 418 may be configured to determine the condition 420 of the device 400 while the device 400 executes/performs/supports an application 414. The controller 418 may be configured to determine the condition 420 of the device 400 as the device 400 (e.g., the subsystems 401 of the device 400) executes/performs/supports the application 414.

The controller 418 may be configured to maintain or otherwise access one or more thresholds. The thresholds may include, for example, a thermal threshold and/or a power threshold. The controller 418 may be configured to compare the condition 420 of the device 400 to the thermal threshold and/or the power threshold. In some embodiments, the controller 418 may be configured to compare a thermal condition (e.g., thermal/energy/heat output/level, for instance measured or otherwise detected by the temperature sensor(s) 424) to the thermal threshold. The controller 418 may be configured to determine whether the thermal condition satisfies a thermal threshold criteria based on the comparison. For example, the thermal condition may satisfy the thermal threshold criterial responsive to the thermal condition (e.g., temperature) being greater than or equal to the thermal threshold.

The controller 418 may be configured to determine to operate at a reduced power level for the application executing on the device 400. In some embodiments, the controller 418 may be configured to determine to operate at a reduced power level from a full (or maximum/unrestricted) power level while the device 400 executes the application 414. In some embodiments, the controller 418 may be configured to determine to operate at a reduced power level based on the condition of the device 400 as compared to one or more of the thresholds maintained by the device 400.

In some embodiments, the controller 418 may be configured to compare a power condition (e.g., measured or otherwise detected by the power/current sensor(s) 424) to the power threshold. The controller 418 may be configured to determine whether the power condition satisfies a power threshold criteria based on the comparison. For example, the power condition may satisfy the power threshold criteria responsive to the power condition (e.g., average/peak/instantaneous power consumption, current draw, present power consumption, etc.) being greater than or equal to the power threshold. In some embodiments, the controller 418 may be configured to determine whether either the thermal threshold criteria and/or the power threshold criteria are satisfied/met/exceeded.

The controller 418 may be configured to generate, establish, set, or otherwise determine a constraint metric 422. The controller 418 may be configured to determine the constraint metric 422 responsive to determining to operate the device 400 at the reduced power level. The constraint metric may be a value set by the controller 418 and can be used by each of the subsystem(s) 401 to selectively adjust their power consumption level. In some embodiments, the constraint metric 422 may be a device-wide (e.g., a subsystem wide) value set by the controller 418. The constraint metric 422 may be a value which is proportional to, generated in relation to, or otherwise corresponds to an amount/difference/degree in which the power condition/thermal condition exceeds/surpasses the power/thermal threshold. For example, as the power condition exceeds the power threshold by a greater degree, the controller 418 may reduce the constraint metric 422 by a greater degree. In some embodiments, the constraint metric 422 may be a subsystem-specific value. For example, the controller 418 may be configured to compute, set, define, generate, or otherwise determine the constraint metric 422 for each individual subsystem 401 of the device 400. The controller 418 may be configured to determine the constraint metric 422 for each of the subsystems 401 according to, for example, the application 414 executing on or supported by the device 400 or an application type of the application 414 executing on or supported by the device 400.

The controller 418 may be configured to transmit, send, provide, or otherwise apply the constraint metric 422. In some embodiments, the controller 418 may be configured to apply the constraint metric 422 responsive to determining to operate the device 400 at a reduced power level. In some embodiments, the controller 418 may be configured to apply the constraint metric 422 by transmitting or providing the constraint metric 422 to the individual subsystems 401. In some embodiments, the controller 418 may be configured to provide the constraint metric 422, with or including an application identifier (ID) or application type of the application 414 executing on the device 400. The application ID and/or type may be used by the subsystems 401 to determine, select, or otherwise identify a constraint metric table 426 to be used for selectively adjusting a power of the subsystem 401, for a specific application for instance. The constraint metric may include/indicate an index, entry or other look-up value for accessing information in the constraint metric table 426. In some embodiments, the controller 418 may be configured to apply the constraint metric 422 by setting a look-up value for a data entry in the constraint metric table 426, corresponding to the constraint metric 422.

The subsystems 401 may be configured to determine the value for the constraint metric 422 (e.g., responsive to receiving the value from the controller 418, responsive to performing a look-up of the constraint metric 422, etc.). In some embodiments, the subsystems 401 may be configured to select, determine, or otherwise identify a constraint metric table 426 from a plurality of constraint metric tables 426 to be used for selecting threshold power level for the respective subsystems 401, and/or adjusting power consumption levels of the respective subsystems 401. In some embodiments, the constraint metric tables 401 may be specific to particular applications. For example, each application 414 executable on the device 400 may have a corresponding application constraint metric table 426. The subsystems 401 may be configured to determine an application 414 executing on the device 400 (e.g., using the application ID received from the controller 418, by querying the OS 416, etc.). The subsystems 401 may be configured to select the application constraint metric table 426 for the application 414 (e.g., using the application ID, and matching the application ID to an ID for the application constraint metric table 426).

Figure 5A:
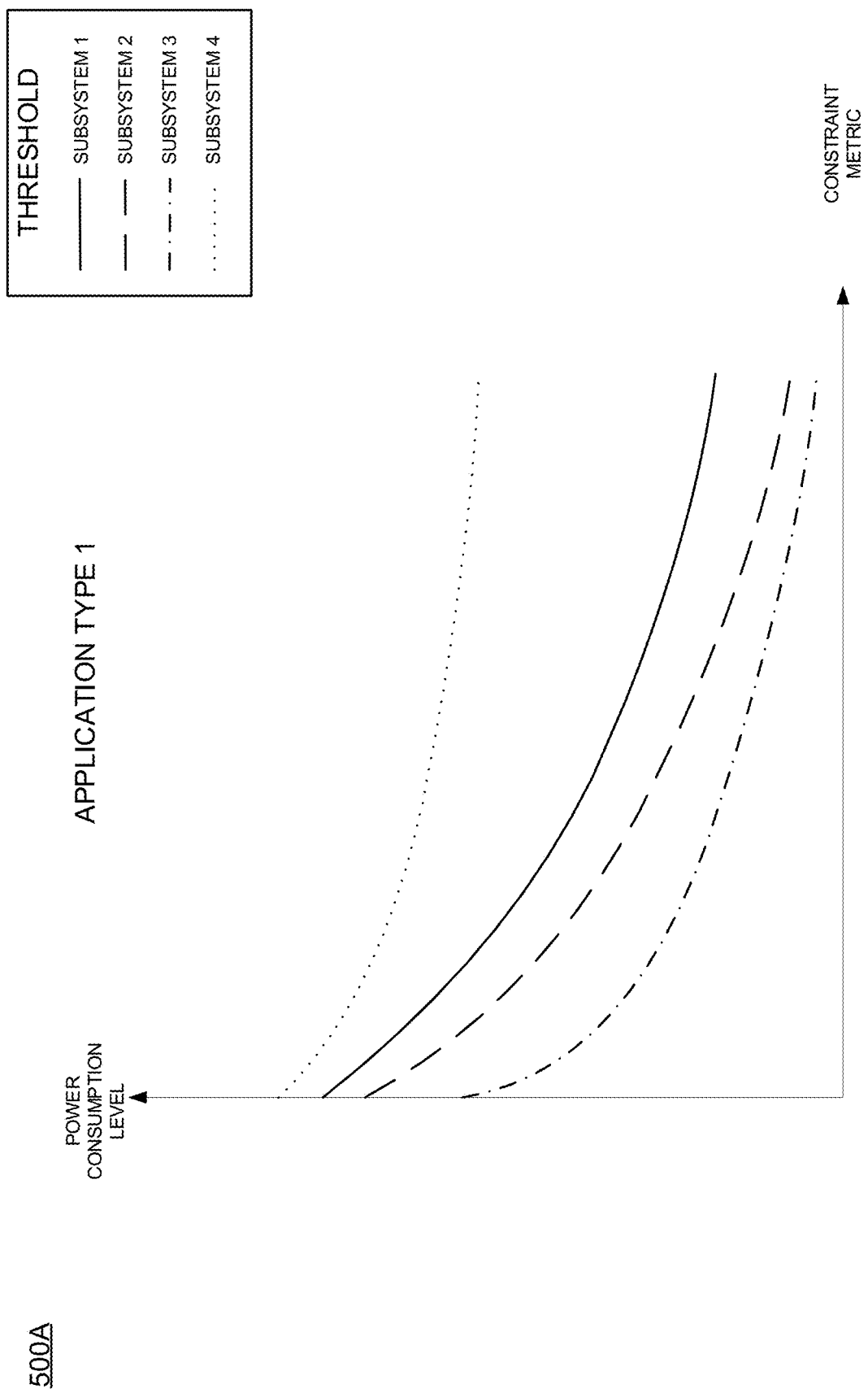
FIG. 5A to FIG. 5C are example graphs showing constraint metrics and corresponding power levels for different application types, according to an example implementation of the present disclosure.
Figure 5B:
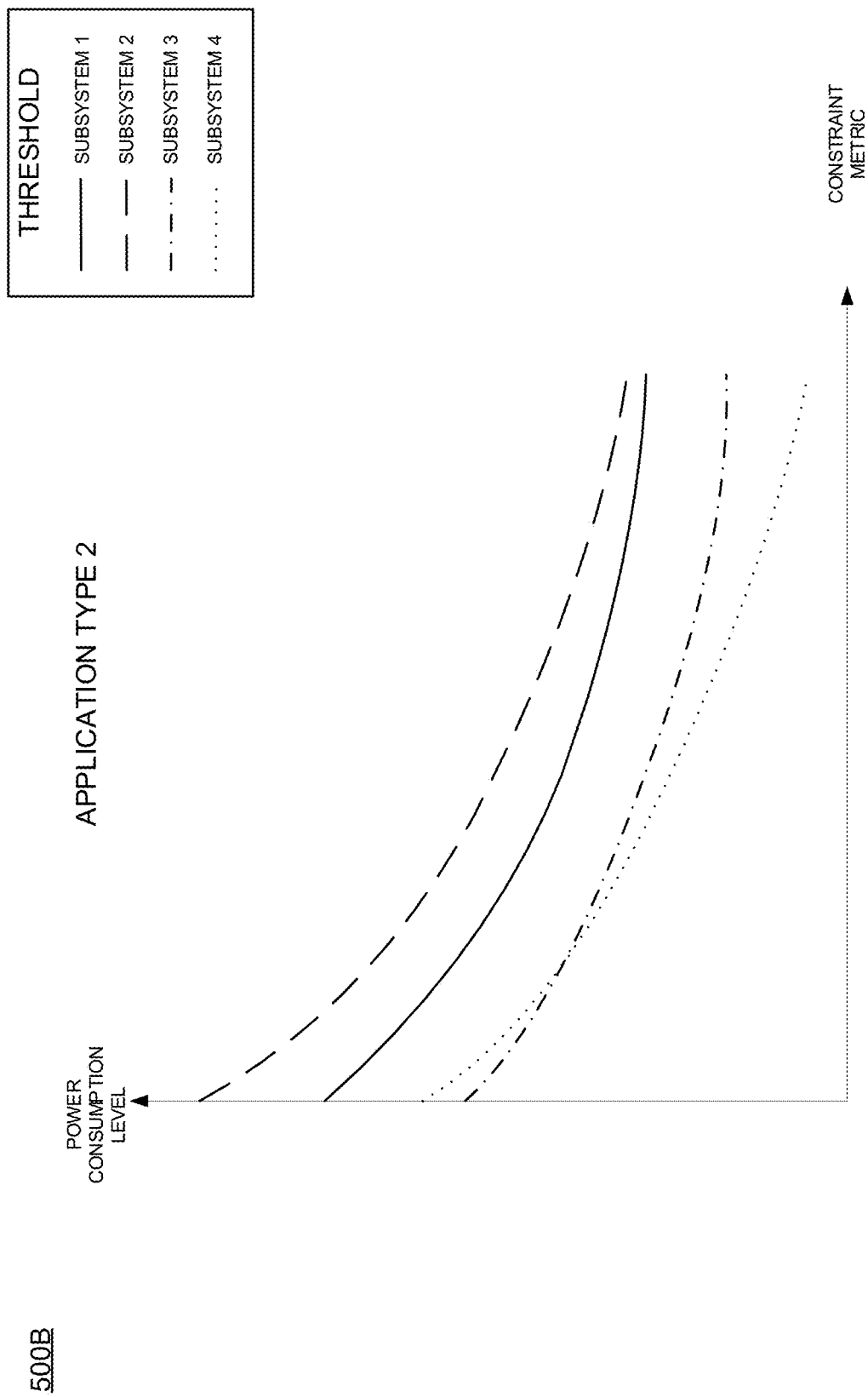
Figure 5C:
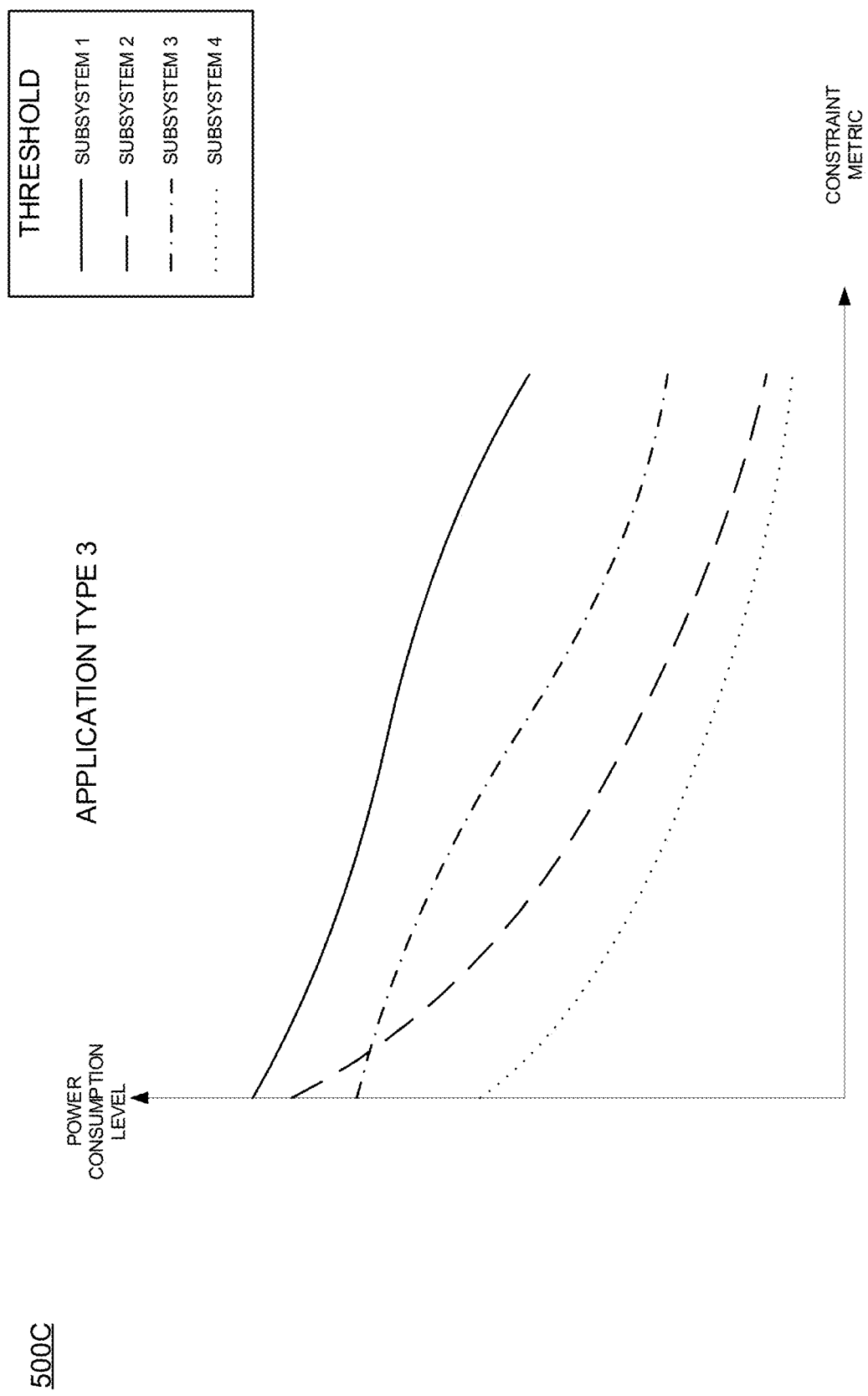

In some embodiments, the constraint metric tables 401 may be specific to particular types of applications. Referring now to FIG. 5A-FIG. 5C, depicted are graphs showing, representing or corresponding to different constraint metric tables 500A-500C for different application types. For example, a device 400 can maintain, include, incorporate, or otherwise access a first constraint metric table 500A for a first application type (e.g., video conferencing applications 414), a second constraint metric table 500B for a second application type (e.g., gaming applications 414), a third constraint metric table 500C for a third application type (e.g., streaming applications 414), etc. The device 400 may maintain any number of constraint metric tables 500 for any number of application types of applications 414 executable on the device 400. In some embodiments, the constraint metric tables 500 may be generated for each device 400 (e.g., by a device manufacturer) and can be loaded/programmed onto the device 400 at deployment/manufacture. In some embodiments, the constraint metric tables 500 may be generated and can be maintained at the operating system-level 416 such that the constraint metric tables 500 may be updated from time to time (e.g., by or as part of updating/upgrading the OS 416 of the device 400). A constraint metric table can include/indicate/specify respective threshold power levels for the device's subsystems, for each constraint metric. For instance, a particular constraint metric can be used to index into the constraint metric table to access/determine a corresponding group of threshold power levels for the subsystems. Various threshold power (consumption) levels for a particular subsystem can vary with the value of the constraint metric, and can be represented by a threshold graph (or plot/curve). While shown as a continuous or substantially continuous plot in FIG. 5A-FIG. 5C, it is noted that the constraint metrics and corresponding threshold power levels for the subsystems may have various steps or levels of granularity. As described in greater detail below, a given subsystem 401 may receive a constraint metric from the controller 418, identify a constraint metric table which corresponds to the application executing/provided by the device, and use the constraint metric as an index to identify a power threshold level for the subsystem.

As shown in FIG. 5A-FIG. 5C, the constraint metric tables 500 may include/represent/indicate subsystem-specific thresholds, which can be represented by a first threshold graph (shown in solid line) for a first subsystem 401, a second threshold graph (shown in dashed line) for a second subsystem 401, a third threshold graph (shown in dot-dashed line) for a third subsystem 401, and a fourth threshold graph (shown in dotted line) for a fourth subsystem 401. While shown as four threshold graphs, it is noted that the constraint metric tables 500 may include/represent threshold graphs for each of the subsystems 401 of the device 400. Each of the threshold graphs may indicate or include a (threshold) power level for a particular constraint metric 422. The power level may be a maximum (e.g., not to exceed, upper limit, etc.) power level of the subsystem 401 for a particular constraint metric 422. The threshold power levels may be selected or otherwise defined to optimize/improve user experience as power of the device 400 is reduced.

Each of the subsystems 401 may be configured to identify a constraint metric table 426 from the plurality of constraint metric tables 426 based on an application type of the application 414 executing on the device 400. In some embodiments, the subsystems 401 may be configured to determine the application type for the application 414 using the application identifier for the application 414. For example, the device 400 may be configured to maintain a database or other data structures which includes application identifiers for each of the applications 414 executable/supported/accessible on the device 400 and an identifier for the corresponding constraint metric table 426 to be used for the application 414. The device 400 may be configured to use the application identifier to perform a look-up in the database to identify a corresponding identifier for the constraint metric table 426. As another example, each constraint metric table 426 may include various tags which are to be used to match application tags with the corresponding constraint metric table 426. As discussed above, applications 414 may be tagged by application developers (e.g., when the application 414 is deployed). The subsystems 401 may be configured to use the tags for the applications 414 to match the application 414 with a corresponding constraint metric table. For example, a video conferencing application 414 may be tagged with a "VIDEO CONFERENCE" tag. Similarly, a constraint metric table 426 for video conferencing applications may be tagged with a "VIDEO CONFERENCE" tag. The subsystems 401 may be configured to identify the tag(s) of the application 414 (e.g., video conferencing application 414) executing on the device 400 and select the constraint metric table 426 for video conferencing applications responsive to the tags being matched.

Figure 6:
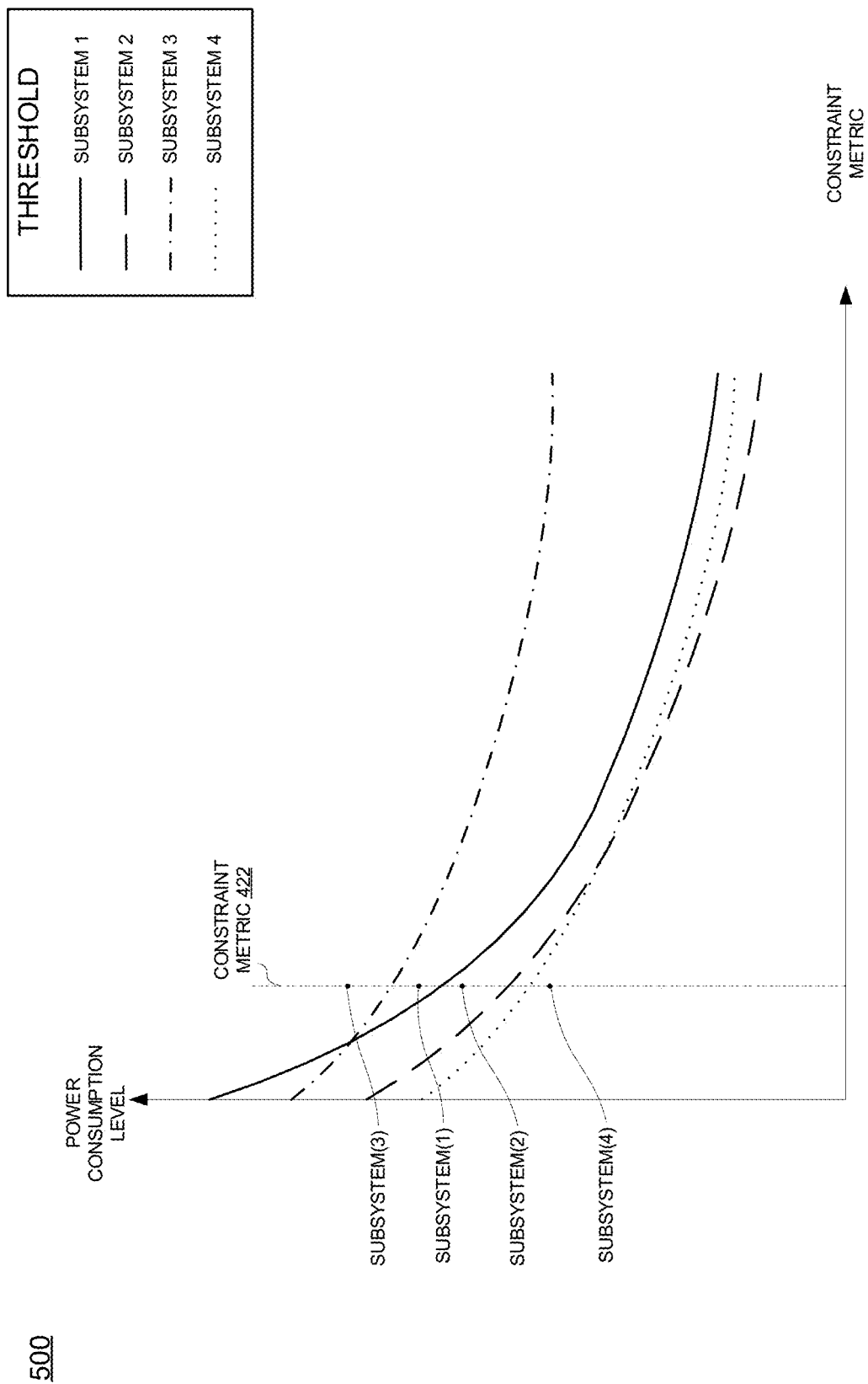
FIG. 6 is an example graph showing constraint metrics and corresponding power levels for different subsystems (e.g., of the device of FIG. 4), according to an example implementation of the present disclosure.

Referring now to FIG. 6, depicted is a graph 600 showing example applications of a constraint metric 422 at the subsystem 401 level, according to an example implementation of the present disclosure. The graph 600 may be representative/illustrative of threshold power levels of various subsystems at various constraint metric values. Following the receiving of the constraint metric 422 and identifying the constraint metric table 426 for the application 414 executing on the device 400, the subsystems 401 may be configured to determine/calculate/estimate their respective power consumption level (e.g., by determining a voltage and current draw as an input to the subsystem 401, for example). The subsystems 401 may be configured to determine a threshold power level of a respective subsystem 401 at the corresponding constraint metric 422 (e.g., received from the controller 418 or otherwise identified by each of the subsystems 401). For example, the subsystems 401 may be configured to perform a look-up function in/of the constraint metric table 426 using an identifier for the subsystem 401 (e.g., subsystem ID) and/or the constraint metric to identify or determine the threshold power level. As shown in FIG. 6 and discussed above, each subsystem 401 may have a different threshold power level, based on the particular application 414 executing/accessed/supported on the device 400, and/or based on the specific value of the constraint metric 422.

Each subsystem 401 may be configured to compare their respective threshold power level to the respective (actual/estimated/measured) power consumption level for the subsystem 401. As such, the comparison may be done by each subsystem 401 on a subsystem-by-subsystem basis. The subsystems 401 may be configured to determine whether their power consumption level exceeds the corresponding threshold power level from the constraint metric table 426 at the constraint metric 422 set by the controller 418. As shown in FIG. 6, some subsystems 401 may have a power consumption level which exceeds the threshold power level for the subsystem 401 at the constraint metric 422 set by the controller 418 (e.g., the first, second and third subsystems), while other subsystems 401 may have a power consumption level which is less than the threshold power level for the subsystem 401 at the constraint metric 422 set by the controller 418 (e.g., the fourth subsystem).

Where the power consumption level for a subsystem 401 is less than (or equal to) the threshold power level at the constraint metric 422, the subsystem 401 may be configured to operate at the current power consumption level. In this regard, the subsystem 401 may be configured to forego adjusting any power consumption level for the subsystem 401 when the subsystem 401 is operating within or at the threshold power level. As such, even where the device 400 is operated at a reduced power level, some subsystems 401 may not be implicated/impacted by the reduction in power consumption.

Where the power consumption level for a subsystem 401 is greater than the threshold power level at the constraint metric 422, the subsystem 401 may be configured to adjust a power consumption level for the subsystem 401. The subsystem 401 may be configured to reduce the power consumption level such that the power consumption level is less than or equal to the threshold power level at the constraint metric 422. In some embodiments, the subsystems 401 may be configured to adjust the power consumption level differently. For example, the display interface 406 subsystem 401 may be configured to adjust a power consumption level by reducing a screen resolution of the display, whereas the compression unit 410 subsystem 401 may be configured to adjust a power consumption level by decreasing a complexity/extent of encoding/decoding used to compress the data. As another example, a central processing unit 402 subsystem 401 may be configured to adjust a power consumption level by decreasing a clock frequency whereas a sensing unit 408 subsystem 401 may be configured to adjust a power consumption level by reducing a sensing sample rate. As such, and in some embodiments, each subsystem 401 may be preconfigured with steps or actions to perform to reduce power consumption level of the subsystem 401. Each of the subsystems 401 having a power consumption level that exceeds the threshold power level may be configured to adjust their power consumption level to be within their corresponding threshold, such that overall power consumption of the device is reduced. Such implementations may provide an application-based power management system that avoids hardware-based (e.g., global) power reduction techniques that can reduce/impact overall user experience.

Figure 7:
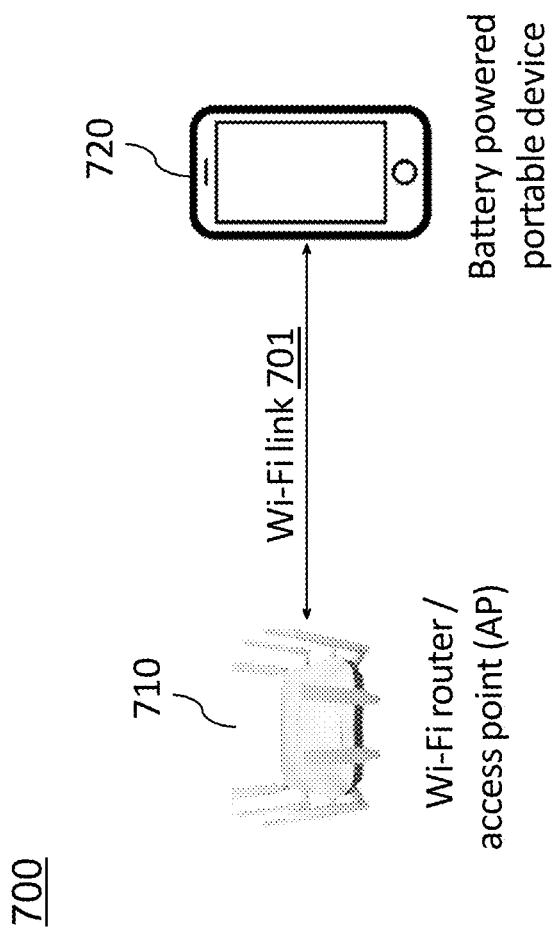
FIG. 7 is a block diagram of a system environment including a power-constrained device, according to an example implementation of the present disclosure.

2. In-Device Estimation of Wi-Fi Power Consumption for Thermal Management in Battery/Self-Powered Wireless Devices FIG. 7 is a block diagram 700 of a system environment including a power-constrained device, according to an example implementation of the present disclosure. FIG. 7 shows an example system environment in which an access point 710 (e.g., Wi-Fi router) and a power-constrained device 720 (e.g., battery powered device such as a mobile device, a smart phone, etc., or a self-power device such as using solar/motion generated energy) communicate to each other via a wireless link 701 (e.g., Wi-Fi link). In such a system environment, two broad categories of applications (e.g., software applications or use cases) can run, or be executed/performed: (1) data-intensive applications; and (2) sporadic applications. Examples of the data-intensive applications may include 4 k video streaming, cloud gaming, remotely rendered AR/VR applications, etc. When the data-intensive applications runs, a radio transceiver in a power-constrained device (e.g., a Wi-Fi radio transceiver in a battery-powered device) may remain always on (e.g., in an active, radio-turned-on state/mode) and may not have opportunity to enter into a power-save/sleep state (or mode). Examples of the sporadic applications may include video calls, aperiodic file transfers, etc. When the sporadic applications runs, a radio transceiver in a power-constrained device (e.g., a Wi-Fi radio transceiver in a battery-powered device) may enter into a power-save/sleep/radio-turned-off mode to conserve battery power.

In one aspect, AR/VR devices (e.g., smart glasses, HWDs, etc.) may be power-constrained devices and hence controlling power consumption of a power-constrained device while actively running a use case/application (e.g., live streaming) may be pivotal to guarantee good user experience. It would be beneficial to estimate power consumption of a device (e.g., real-time power consumption) while serving/running/executing a use case/application and perform power/thermal management based on the estimated power consumption.

To address these problems, embodiments of the present disclosure provide mechanisms to estimate Wi-Fi power consumption (e.g., power consumption while performing Wi-Fi operations, such as transmission (Tx), reception (Rx), listen, sleep, etc.) for thermal management in power-constrained devices. In some embodiments, a device or system may perform in-device estimation of Wi-Fi power consumption for thermal management in battery-powered wireless devices (e.g., battery powered device 720 in FIG. 7). In some embodiments, a device or system may perform power management and/or thermal management in power-constrained (e.g., battery-powered) devices. In some embodiments, a framework (e.g., systems and/or methods) may estimate power expenditure (or consumption) of a device (e.g., battery-powered or power-constrained device) while actively being engaged in a use case (e.g., application) for thermal management of the device.

In one approach, an average Wi-Fi power consumption of a battery-powered wireless device may be determined/estimated/calculated/monitored when running a use case/application (e.g., during the runtime or in real time). In some embodiments, estimation of Wi-Fi power consumption may be in-device (e.g., estimation can be performed in a device, or estimation mechanism can be integrated in a device), dynamic, non-invasive, and/or nonintrusive (e.g., estimation can be done without significant impacts (or with a minimal impact) on performance or operations of the device).

In some embodiments, a system may perform power mitigation (e.g., alleviation, reduction, adjustment) and/or thermal mitigation based on estimated power consumption. For example, if the battery capacity of a device is known/estimated/detected along with estimated Wi-Fi power consumption to support a use case (e.g., software application), then the system may compute a percentage of battery consumption to run/perform/carry out/execute the use case or determine a maximum run-time of the use case subject to an upper bound on battery consumption. In some embodiments, if the battery capacity of a device is known/estimated/detected along with estimated Wi-Fi power consumption to support a use case (e.g., software application), then the system may trigger thermal mitigation measures, for example, throttling of use case data traffic rate (e.g., 4K video to 2K video), reduction in Wi-Fi radio transmit power, in-device notification (e.g., using sound, display) to users to move closer to Wi-Fi AP (e.g., AP 710 in FIG. 7) in order to achieve higher Wi-Fi link throughput. In some embodiments, methods for estimation of Wi-Fi power consumption may not be predicated on the presence of a dedicated module to measure/monitor Wi-Fi power consumption, thereby being non-invasive and/or nonintrusive.

In one approach, a system may estimation Wi-Fi power consumption in a battery-powered device which runs/executes/carry out an example use case (e.g., software application) in which the device is always on. For example, the device may run a data-intensive traffic use case so that there may be always data for Wi-Fi radio (e.g., Wi-Fi transceiver) to transmit (Tx) and/or receive (Rx). Examples of application payload for Tx in data-intensive traffic use cases may include streaming voice, video, etc. For example, when an application payload for Tx arrives (for a particular use case/application), a Wi-Fi transceiver (or 802.11 MAC/PHY layers of the device) may perform/have/attempt a channel access to perform transmission of the (payload) data, and then remain in a listen state until receiving data. In some embodiments, in the listen state, the transceiver may scan beacon messages from an access point. Upon completion of receiving the data, the transceiver may enter into a listen state and remain in the listen state until another (second) application payload for Tx arrives. The transceiver may perform/have/attempt a channel access to perform transmission of the second (payload) data, and then remain in a listen state.

In some embodiments, the system may estimate an average power consumption of performing Wi-Fi operations during a window of observation/measurement (denoted by $t_{Observation}$), using the following steps 1-3. In a first step, the system may measure total times for different device status (Tx, Rx, listen, etc.) during the window of observation $t_{Observation}$. Measured total times may include (1) a total (or aggregated) Tx time (denoted by $t_{Tx}$) for which the device is actively transmitting data or frames during the window of observation t Observation; (2) a total (or aggregated) Rx time (denoted by $t_{Rx}$) for which the device is actively receiving data or frames during the window of observation $t_{Observation}$; and/or (3) a total (or aggregated) Listen time (denoted by $t_{Listen}$) for which the device is in a listen state (e.g., time for channel access and time for the listen state) during the window of observation $t_{Observation}$. In some embodiments, the total times $t_{Tx}$, $t_{Rx}$, $t_{Listen}$ can be directly measured using non-intrusive Wi-Fi measurements (e.g., using firmware controlling a Wi-Fi transceiver, a wireless network interface, and/or a wireless network card). In some embodiments, the total times $t_{Tx}$, $t_{Rx}$, $t_{Listen}$ can be obtained/measured by invoking an application programming interface (API) to obtain time values from a lower layer (MAC or physical layer) of a network stack in the device. In some embodiments, the total Listen time $t_{Listen}$ may either be directly measured or derived from other quantities using the following equation:

$$t_{Listen} = t_{Observation} - t_{Tx} - t_{Rx} \quad \text{(Equation 1)}$$

In a second step, the system may calculate/obtain power consumption values for different device status (TX, RX, listen, etc.) during the window of observation $t_{Observation}$. Calculated power consumption values may include (1) a Tx power consumption value (denoted by $P_{Tx}$) of the device in an active Tx state during the window of observation $t_{Observation}$; (2) a Rx power consumption value (denoted by $P_{Rx}$) of the device in an active Rx state during the window of observation $t_{Observation}$; and/or (3) a Listen power consumption value (denoted by $P_{Listen}$) of the device in a listen state during the window of observation $t_{Observation}$.

In some embodiments, the Tx power consumption value ($P_{Tx}$) may indicate power consumption in the radio transceiver and Wi-Fi (WLAN) front-end modules (FEM) in an active Tx state. $P_{Tx}$ may be calculated/estimated based on Tx power level, channel bandwidth (BW), modulation-and-coding scheme (MCS) index, and/or number of spatial streams (NSS). In some embodiments, $P_{Rx}$ may be calculated/estimated based on channel BW and/or NSS. In some embodiments, $P_{Listen}$ may be may be calculated/estimated based on channel BW. In some embodiments, the power consumption values $P_{Tx}$, $P_{Rx}$, $P_{Listen}$ may be dependent on Wi-Fi chips. In some embodiments, the power consumption values $P_{Tx}$, $P_{Rx}$, $P_{Listen}$ can be calculated/obtained/estimated by table lookup. For example, the system can measure/obtain a Tx power level, BW, MCS index and/or NSS, and look up a corresponding Tx power value ($P_{Tx}$) from one or more tables. The system can measure/obtain BW and/or NSS, and look up a corresponding Rx power value ($P_{Rx}$) from one or more tables. The system can measure/obtain BW, and look up a corresponding Listen power value ($P_{Listen}$) from one or more tables.

In a third step, the system may calculate/estimate an average power consumption value during the window of observation $t_{Observation}$ using the following equation:

$$\text{Average power consumption} = \frac{P_{Tx} * t_{Tx} + P_{Rx} * t_{Rx} + P_{Listen} * t_{Listen}}{t_{Observation}} \quad \text{(Equation 2)}$$

In one approach, a system may estimation Wi-Fi power consumption in a battery-powered device which runs/executes/carry out an example use case (e.g., software application) in which the device may enter into a sleep/power-save state. For example, the device may run a sporadic traffic use case in which there may exist a large time-gap between arrival of application payload for Tx and traffic Rx. For example, when an application payload for Tx arrives (for a particular use case/application), a Wi-Fi transceiver (or 802.11 MAC/PHY layers of the device) may perform/have/attempt a channel access to perform transmission of the (payload) data, and then remain in a listen state until receiving data. In some embodiments, in the listen state, the transceiver may scan beacon messages from an access point. Upon completion of receiving the data, the transceiver may enter into a listen state (or an inactive state) and remain in the listen state until the transceiver enters into a power-save/sleep/radio-turned-off state. In some embodiments, in a sleep state/mode, the device or the transceiver may be ready to wake up and perform Tx or Rx.

In some embodiments, the system may estimate an average power consumption of performing Wi-Fi operations during a window of observation/measurement (denoted by $t_{Observation}$), using the following steps 1-3. In a first step, the system may measure total times for different device status (Tx, Rx, listen, sleep, etc.) during the window of observation $t_{Observation}$. Measured total times may include (1) a total (or aggregated) Tx time (denoted by $t_{Tx}$) for which the device is actively transmitting data or frames during the window of observation $t_{Observation}$; (2) a total (or aggregated) Rx time (denoted by $t_{Rx}$) for which the device is actively receiving data or frames during the window of observation $t_{Observation}$; (3) a total (or aggregated) Listen time (denoted by $t_{Listen}$) for which the device is in a listen state (e.g., time for channel access, time for the listen state, and an inactivity period) during the window of observation $t_{Observation}$; and/or (4) a total (or aggregated) Sleep time (denoted by $t_{Sleep}$) for which the device is in a sleep/power-save state during the window of observation $t_{Observation}$. In some embodiments, the total times $t_{Tx}$, $t_{Rx}$, $t_{Listen}$, $t_{Sleep}$ can be directly measured using non-intrusive Wi-Fi measurements (e.g., using firmware controlling a Wi-Fi transceiver, a wireless network interface, and/or a wireless network card). In some embodiments, the total times $t_{Tx}$, $t_{Rx}$, $t_{Listen}$, $t_{Sleep}$ can be obtained/measured by invoking an application programming interface (API) to obtain time values from a lower layer (MAC or physical layer) of a network stack in the device. In some embodiments, the total Listen time $t_{Listen}$ and the total Sleep time $t_{Sleep}$ may either be directly measured or derived from other quantities ($t_{Tx}$, $t_{Rx}$, and $t_{Observation}$) using the following equations:

$$t_{Listen} = t_{Observation} - t_{Tx} - t_{Rx} - t_{Sleep} \quad \text{(Equation 3)}$$

$$t_{Sleep} = t_{Observation} - t_{Tx} - t_{Rx} - t_{Listen} \quad \text{(Equation 4)}$$

In a second step, the system may calculate/obtain power consumption values for different device status (TX, RX, listen, sleep, etc.) during the window of observation $t_{Observation}$. Calculated power consumption values may include (1) a Tx power consumption value (denoted by $P_{Tx}$) of the device in an active Tx state during the window of observation $t_{Observation}$; (2) a Rx power consumption value (denoted by $P_{Rx}$) of the device in an active Rx state during the window of observation $t_{Observation}$; (3) a Listen power consumption value (denoted by $P_{Listen}$) of the device in a listen state during the window of observation $t_{Observation}$; and/or (4) a Sleep power consumption value (denoted by $P_{Sleep}$) of the device in a sleep/power-save state during the window of observation $t_{Observation}$.

In some embodiments, the Tx power consumption value ($P_{Tx}$) may indicate power consumption in the radio transceiver and Wi-Fi (WLAN) FEM in an active Tx state. $P_{Tx}$ may be calculated/estimated based on Tx power level, BW, MCS index, and/or NSS. In some embodiments, $P_{Rx}$ may be calculated/estimated based on channel BW and/or NSS. In some embodiments, $P_{Listen}$ may be may be calculated/estimated based on channel BW. In some embodiments, the power consumption values $P_{Tx}$, $P_{Rx}$, $P_{Listen}$, $P_{Sleep}$ may be dependent on Wi-Fi chips. For example, $P_{sleep}$ may be a (predetermined) power consumption value dependent on Wi-Fi chips of the Wi-Fi transceiver of the device. In some embodiments, the power consumption values $P_{Tx}$, $P_{Rx}$, $P_{Listen}$ can be calculated/obtained/estimated by table lookup. For example, the system can measure/obtain a Tx power level, BW, MCS index and/or NSS, and look up a corresponding Tx power value ($P_{Tx}$) from one or more tables. The system can measure/obtain BW and/or NSS, and look up a corresponding Rx power value ($P_{Rx}$) from one or more tables. The system can measure/obtain BW, and look up a corresponding Listen power value ($P_{Listen}$) from one or more tables.

In a third step, the system may calculate/estimate an average power consumption value during the window of observation $t_{Observation}$ using the following equation:

$$\text{Average power consumption} = \frac{P_{Tx} * t_{Tx} + P_{Rx} * t_{Rx} + P_{listen} * t_{Listen} + P_{Sleep} * t_{Sleep}}{t_{Observation}} \quad \text{(Equation 5)}$$

In one approach, a system may perform power manage and/or thermal management of battery-powered devices based on estimated average power consumption. In some embodiments, the system may estimate an average power consumption of a device (e.g., battery-powered device), and perform power/thermal mitigation actions (e.g., actions for mitigating, alleviating, reducing, or adjusting power and/or temperature of the device) based on the estimated average power consumption. In some embodiments, a system or a device may include an application (e.g., software application/use case), a Wi-Fi power consumption estimator ("estimator"), and Wi-Fi (WLAN) firmware ("Wi-Fi firmware"). In some embodiments, the device may execute the application, and the estimator of the device may perform an in-device estimation of Wi-Fi power consumption using the Wi-Fi firmware. In some embodiments, the estimator may be implemented in software, firmware, hardware, or a combination thereof.

In some embodiments, the application, the estimator, and the Wi-Fi firmware may communicate with each other using the following steps. In a first step, the application may provide a running/executing status (e.g., either ON or OFF) to the estimator. In a second step, the estimator may periodically (e.g., every observation period of $t_{Observation}$) perform queries on the Wi-Fi firmware for power/channel information (e.g., TX power level, channel BW, MCS index, and/or NSS), values of times (e.g., $t_{Tx}$, $t_{Rx}$, $t_{Listen}$, $t_{Sleep}$), and/or power consumption (e.g., $P_{Tx}$, $P_{Rx}$, $P_{Listen}$, $P_{Sleep}$). In a third step, in response to the queries from the estimator, the Wi-Fi firmware may provide values for power/channel information, times, and/or power consumption. In a fourth step, the estimator may estimate/calculate/obtain an average power consumption per the observation period $t_{Observation}$ (e.g., using Equation 2 or Equation 5). In some embodiments, the estimator may measure/estimate/obtain a current level of battery power of the device. In some embodiments, based on the estimated average power consumption and the current level of battery power, the estimator may determine how long the device can be sustained and/or whether to perform mitigation actions. In a fifth step, in response to determining to perform mitigation actions, the estimator may trigger the application to perform mitigation actions (e.g., throttle application data/traffic rate, reduce Wi-Fi radio transmit power, in-device notification to users to move closer to a Wi-Fi AP).

Figure 8:
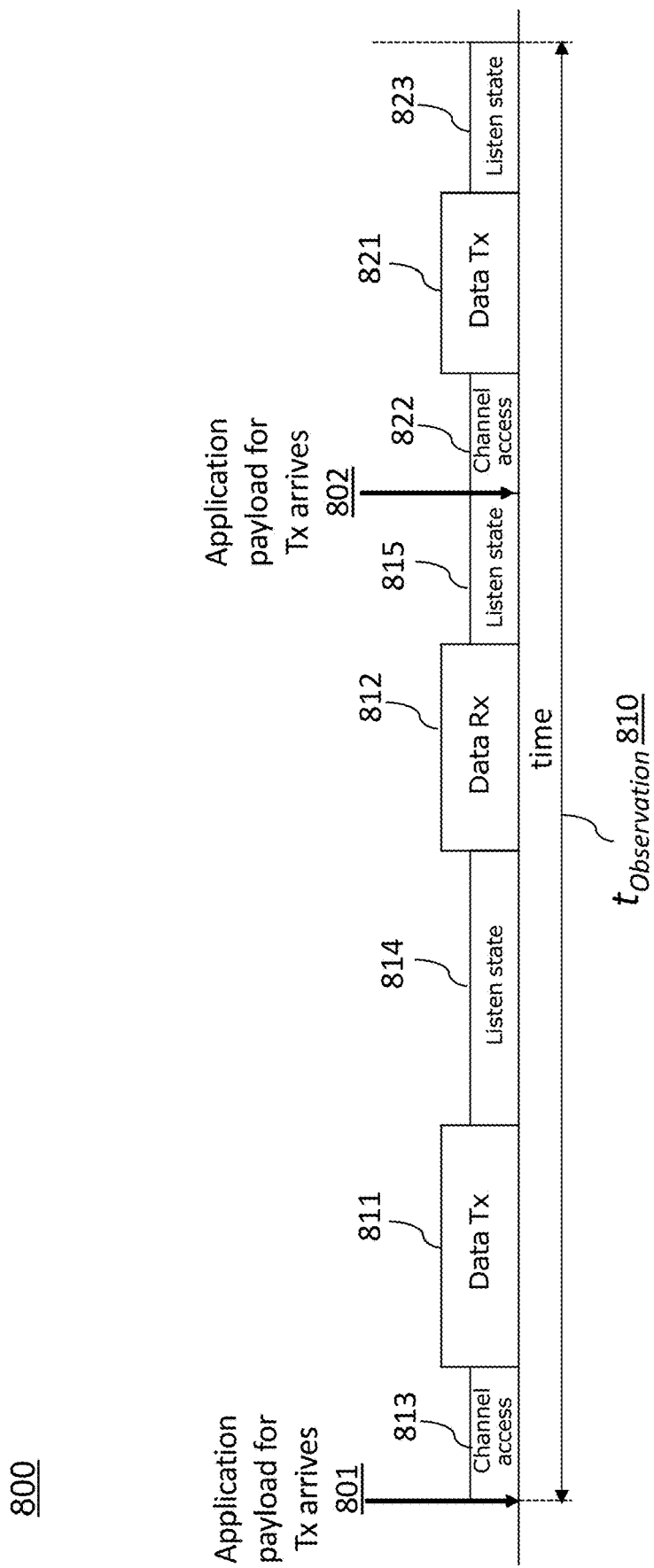
FIG. 8 is a timing diagram for estimation of power consumption in a device which is always on, according to an example implementation of the present disclosure.

FIG. 8 is a timing diagram 800 for estimation of power consumption in a device (e.g., battery-powered device 720) which is always on, according to an example implementation of the present disclosure. A system or a device (e.g., console 120, HWD 150, device 400, battery-powered device 720, or any computing system 314) may estimation Wi-Fi power consumption in a battery-powered device which runs/executes/carry out an example use case (e.g., software application) in which the device is always on. For example, the device may run a data-intensive traffic use case so that there may be always data for Wi-Fi radio (e.g., Wi-Fi transceiver) to transmit (Tx) and/or receive (Rx). Examples of application payload for Tx in data-intensive use cases may include streaming voice, video, etc. Referring to FIG. 8, when an application payload for Tx arrives 801 (for a data-intensive use case/application), a Wi-Fi transceiver (or 802.11 MAC/PHY layers of the device) may perform/have/attempt a channel access 813 to perform transmission of the (payload) data 811, and then remain in a listen state 614 until receiving data 812. In some embodiments, in the listen state, the transceiver may scan beacon messages from an access point. Upon completion of receiving the data 812, the transceiver may enter into a listen state and remain in the listen state 815 until another (second) application payload for Tx arrives 802. The transceiver may perform/have/attempt a channel access 822 to perform transmission of the second (payload) data 821, and then remain in a listen state 823.

In some embodiments, the system may estimate an average power consumption of performing Wi-Fi operations during a window of observation/measurement 810 (denoted by $t_{Observation}$), using the following steps 1-3. In a first step, the system may measure total times for different device status (Tx, Rx, listen, etc.) during the window of observation $t_{Observation}$ 810. Measured total times may include (1) a total (or aggregated) Tx time $t_{Tx}$ for which the device is actively transmitting data or frames during the window of observation $t_{Observation}$ 810; (2) a total (or aggregated) Rx time $t_{Rx}$ for which the device is actively receiving data or frames during the window of observation $t_{Observation}$ 810; and/or (3) a total (or aggregated) Listen time $t_{Listen}$ for which the device is in a listen state (e.g., time for channel access and time for the listen state) during the window of observation $t_{Observation}$ 810. For example, times for Wi-Fi operations 811, 812, 813, 814, 815, 821, 822, 823 can be measured or calculated, and the measured times are denoted by $t_{811}$, $t_{812}$, $t_{813}$, $t_{814}$, $t_{815}$, $t_{821}$, $t_{822}$, $t_{823}$, respectively. The total times $t_{Tx}$, $t_{Rx}$, $t_{Listen}$ can be calculated as follows:

$$t_{Tx} = t_{811} + t_{821}; t_{Rx} = t_{812}; t_{Listen} = t_{813} + t_{814} + t_{815} + t_{822} + t_{823}.$$

In a second step, the system may calculate/obtain power consumption values for different device status (TX, RX, listen, etc.) during the window of observation $t_{Observation}$ 810. Calculated power consumption values may include (1) a Tx power consumption value $P_{Tx}$ of the device in an active Tx state during the window of observation $t_{Observation}$ 810; (2) a Rx power consumption value $P_{Rx}$ of the device in an active Rx state during the window of observation $t_{Observation}$ 810; and/or (3) a Listen power consumption value $P_{Listen}$ of the device in a listen state during the window of observation $t_{Observation}$ 810.

In some embodiments, $P_{Tx}$ may be calculated/estimated based on Tx power level, channel BW), MCS index, and/or NSS. $P_{Rx}$ may be calculated/estimated based on channel BW and/or NSS. $P_{Listen}$ may be may be calculated/estimated based on channel BW. The power consumption values $P_{Tx}$, $P_{Rx}$, $P_{Listen}$ may be dependent on Wi-Fi chips. The power consumption values $P_{Tx}$, $P_{Rx}$, $P_{Listen}$ can be calculated/obtained/estimated by table lookup. For example, the system can measure/obtain a Tx power level, BW, MCS index and/or NSS, and look up a corresponding Tx power value ($P_{Tx}$) from one or more tables. The system can measure/obtain BW and/or NSS, and look up a corresponding Rx power value ($P_{Rx}$) from one or more tables. The system can measure/obtain BW, and look up a corresponding Listen power value ($P_{Listen}$) from one or more tables. In a third step, the system may calculate/estimate an average power consumption value during the window of observation $t_{Observation}$ using Equation 2.

Figure 9:
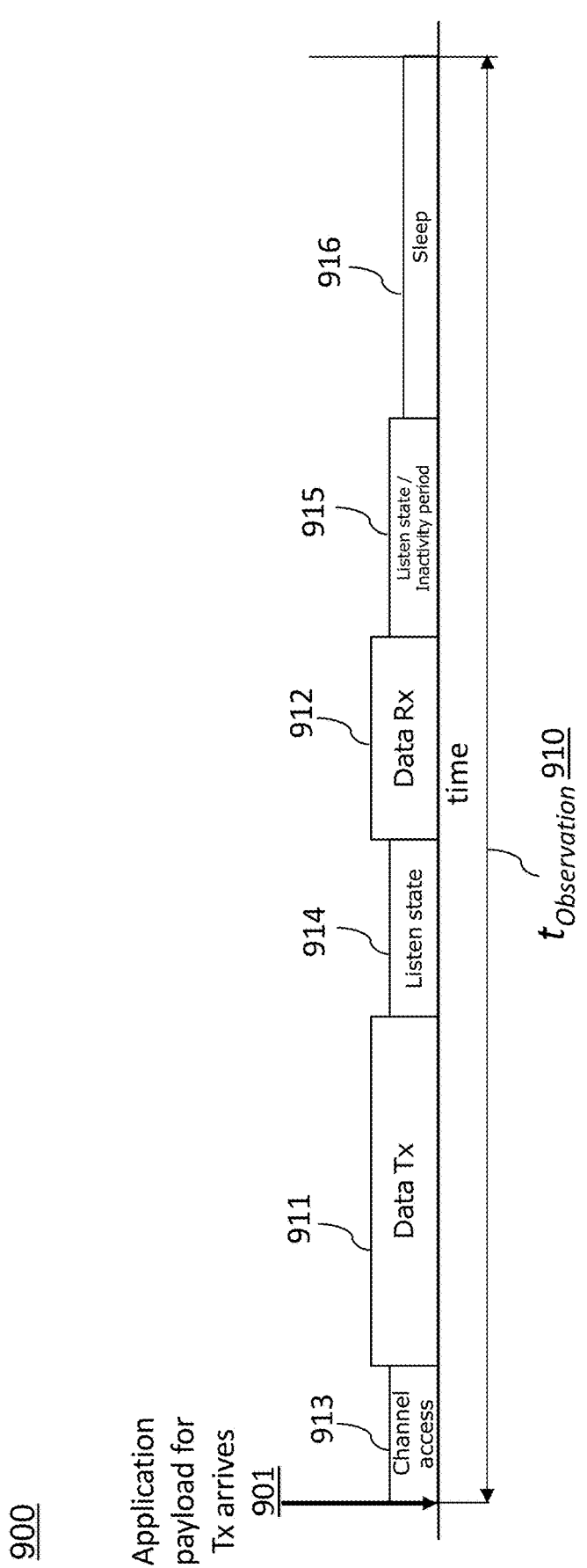
FIG. 9 is a timing diagram for estimation of power consumption in a device which enters a sleep state (e.g., power-save mode), according to an example implementation of the present disclosure.

FIG. 9 is a timing diagram 900 for estimation of power consumption in a device which enters a sleep state (e.g., power-save mode), according to an example implementation of the present disclosure. A system may estimation Wi-Fi power consumption in a battery-powered device (e.g., device 720) which runs/executes/carry out an example use case (e.g., software application) in which the device may enter into a sleep/power-save state. For example, the device may run a sporadic traffic use case in which there may exist a large time-gap between arrival of application payload for Tx and traffic Rx. Referring to FIG. 9, when an application payload for Tx arrives 901 (for a sporadic traffic use case/application), a Wi-Fi transceiver (or 802.11 MAC/PHY layers of the device) may perform/have/attempt a channel access 913 to perform transmission of the (payload) data 911, and then remain in a listen state 914 until receiving data 912. In the listen state, the transceiver may scan beacon messages from an access point. Upon completion of receiving the data 912, the transceiver may enter into a listen state (or an inactive state) and remain in the listen state 915 until the transceiver enters into a power-save/sleep/radio-turned-off state 916. In a sleep state/mode, the device or the transceiver may be ready to wake up and perform Tx or Rx.

In some embodiments, the system may estimate an average power consumption of performing Wi-Fi operations during a window of observation/measurement $t_{Observation}$ 910, using the following steps 1-3. In a first step, the system may measure total times for different device status (Tx, Rx, listen, sleep, etc.) during the window of observation $t_{Observation}$ 910. Measured total times may include (1) a total (or aggregated) Tx time $t_{Tx}$ for which the device is actively transmitting data or frames during the window of observation $t_{Observation}$ 910; (2) a total (or aggregated) Rx time $t_{Rx}$ for which the device is actively receiving data or frames during the window of observation $t_{Observation}$ 910; (3) a total (or aggregated) Listen time $t_{Listen}$ for which the device is in a listen state (e.g., time for channel access, time for the listen state, and an inactivity period) during the window of observation $t_{Observation}$ 910; and/or (4) a total (or aggregated) Sleep time $t_{Sleep}$ for which the device is in a sleep/power-save state during the window of observation $t_{Observation}$ 910. For example, times for Wi-Fi operations 911, 912, 913, 914, 915, 916 can be measured or calculated, and the measured times are denoted by $t_{911}$, $t_{912}$, $t_{913}$, $t_{914}$, $t_{915}$, $t_{916}$, respectively. The total times $t_{Tx}$, $t_{Rx}$, $t_{Listen}$, $t_{Sleep}$ can be calculated as follows:

$$t_{Tx} = t_{911}; t_{Rx} = t_{912}; t_{Listen} = t_{913} + t_{914} + t_{915}; t_{Sleep} = t_{916}.$$

In a second step, the system may calculate/obtain power consumption values for different device status (TX, RX, listen, sleep, etc.) during the window of observation $t_{Observation}$ 910. Calculated power consumption values may include (1) a Tx power consumption value $P_{Tx}$ of the device in an active Tx state during the window of observation $t_{Observation}$ 910; (2) a Rx power consumption value PRE of the device in an active Rx state during the window of observation $t_{Observation}$ 910; (3) a Listen power consumption value $P_{Listen}$ of the device in a listen state during the window of observation $t_{Observation}$ 910; and/or (4) a Sleep power consumption value $P_{Sleep}$ of the device in a sleep/power-save state during the window of observation $t_{Observation}$ 910.

In some embodiments, $P_{Tx}$ may be calculated/estimated based on Tx power level, BW, MCS index, and/or NSS. In some embodiments, $P_{Rx}$ may be calculated/estimated based on channel BW and/or NSS. In some embodiments, $P_{Listen}$ may be may be calculated/estimated based on channel BW. In some embodiments, the power consumption values $P_{Tx}$, $P_{Rx}$, $P_{Listen}$, $P_{Sleep}$ may be dependent on Wi-Fi chips. For example, $P_{Sleep}$ may be a (predetermined) power consumption value dependent on Wi-Fi chips of the Wi-Fi transceiver of the device. In some embodiments, the power consumption values $P_{Tx}$, $P_{Rx}$, $P_{Listen}$ can be calculated/obtained/estimated by table lookup. For example, the system can measure/obtain a Tx power level, BW, MCS index and/or NSS, and look up a corresponding Tx power value ($P_{Tx}$) from one or more tables. The system can measure/obtain BW and/or NSS, and look up a corresponding Rx power value ($P_{Rx}$) from one or more tables. The system can measure/obtain BW, and look up a corresponding Listen power value ($P_{Listen}$) from one or more tables. In a third step, the system may calculate/estimate an average power consumption value during the window of observation $t_{Observation}$ using Equation 5.

Figure 10:
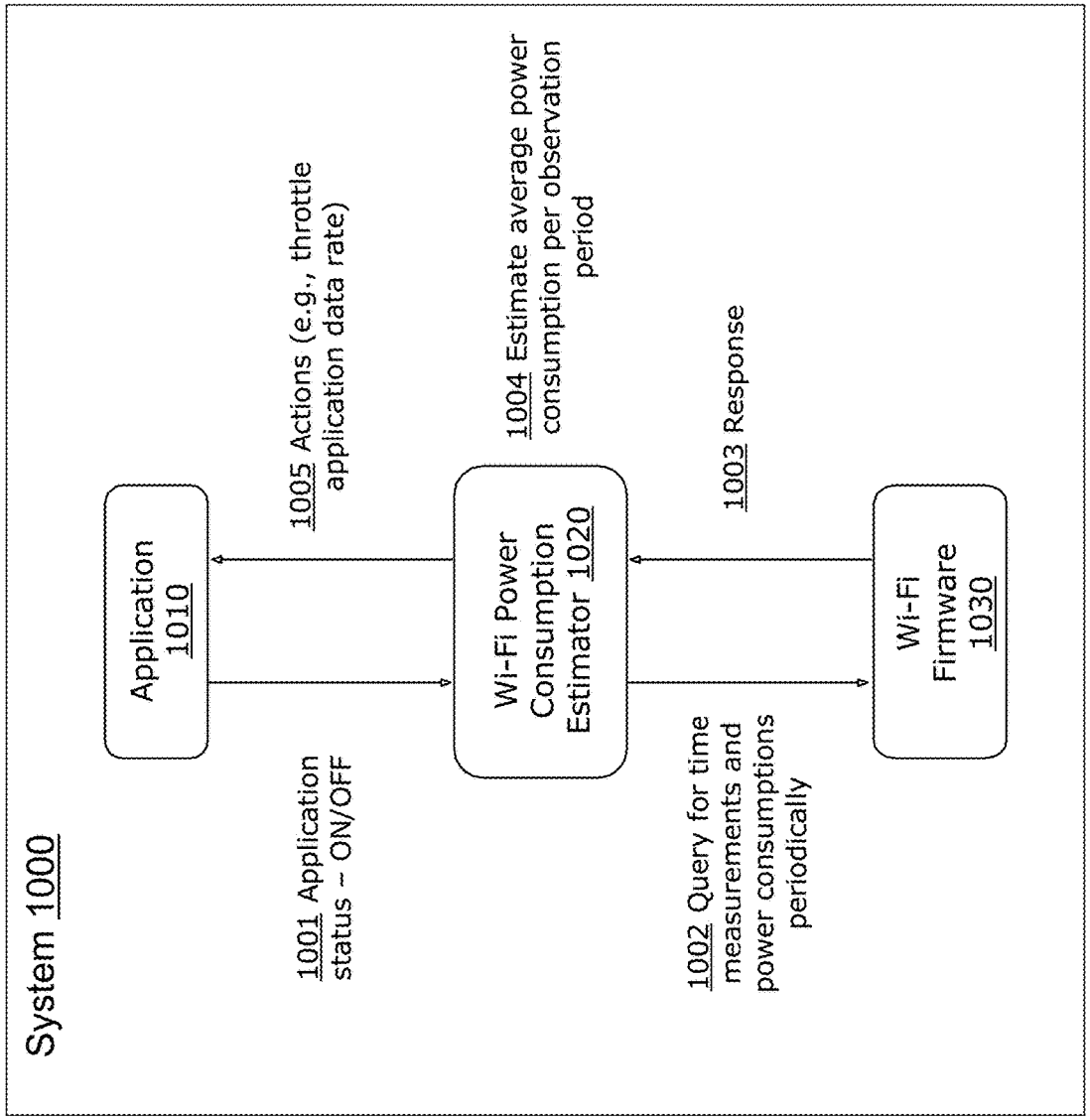
FIG. 10 is a block diagram of a system for power management and/or thermal management of a Wi-Fi device, according to an example implementation of the present disclosure.

FIG. 10 is a block diagram of a system 1000 for power management and/or thermal management of a Wi-Fi device, according to an example implementation of the present disclosure. The system 1000 may perform power manage and/or thermal management of battery-powered devices based on estimated average power consumption. The system 1000 may estimate an average power consumption of a device (e.g., battery-powered device 720), and perform power/thermal mitigation actions (e.g., actions for mitigating, alleviating, reducing, or adjusting power and/or temperature of the device) based on the estimated average power consumption. In some embodiments, the system 1000 may be a battery-powered device (e.g., battery-powered device 720), estimate its own average power consumption, and perform power/thermal mitigation actions based on the estimated average power consumption. The system/device 1000 may include an application 1010 (e.g., software application/use case), a Wi-Fi power consumption estimator ("estimator") 1020, and Wi-Fi (WLAN) firmware ("Wi-Fi firmware") 1030. The system/device 1000 may execute the application 1010, and the estimator 1020 may perform an in-device estimation of Wi-Fi power consumption using the Wi-Fi firmware 1030. The estimator 1020 may be implemented in software, firmware, hardware, or a combination thereof.

Referring to FIG. 10, the application 1010, the estimator 1020, and the Wi-Fi firmware 1030 may communicate with each other using the following steps. In step 1001, the application 1010 may provide a running/executing status (e.g., either ON or OFF) to the estimator 1020. In step 1002, the estimator 1020 may periodically (e.g., every observation period of $t_{Observation}$) perform queries on the Wi-Fi firmware 1030 for power/channel information (e.g., TX power level, channel BW, MCS index, and/or NSS), values of times (e.g., $t_{Tx}$, $t_{Rx}$, $t_{Listen}$, $t_{Sleep}$), and/or power consumption (e.g., $P_{Tx}$, $P_{Rx}$, $P_{Listen}$, $P_{Sleep}$). In step 1003, in response to the queries from the estimator 1020, the Wi-Fi firmware 1030 may provide values for power/channel information, times, and/or power consumption. In step 1004, the estimator 1020 may estimate/calculate/obtain an average power consumption per the observation period $t_{Observation}$ (e.g., using Equation 2 or Equation 5). The estimator 1020 may measure/estimate/obtain a current level of battery power of the system/device 1000. Based on the estimated average power consumption and the current level of battery power, the estimator 1020 may determine how long the device can be sustained and/or whether to perform mitigation actions. In step 1005, in response to determining to perform mitigation actions, the estimator 1020 may trigger the application to perform mitigation actions (e.g., throttle application data/traffic rate, reduce Wi-Fi radio transmit power, in-device notification to users to move closer to a Wi-Fi AP).

3. Power Budget-Based Subsystem Mitigation

In one aspect, a power budget of a system, device, or application refers to an amount of power (e.g., a maximum amount of power) that is available for use in the given system, device or application. It would be beneficial to calculate power budget of subsystems of a device and perform power mitigation (e.g., alleviation, reduction, or adjustment of power) dynamically based on the power budget and changes of subsystem power consumption.

To address this problem, embodiments of the present disclosure provide mechanisms to manage thermal management for a system or a device (e.g., AR/VR device) by performing power mitigation on one or more subsystems of the system or the device based on power budget. In one approach, a power budget computation system may compute/estimate power budget of a device based on active use cases (e.g., applications running in a system/device) and a temperature of the device. In some embodiments, the device may include a plurality of subsystems, and the power budget of the device may include a power budget of a respective subsystem of the device. In some embodiments, the active use cases of a system/device may refer to use cases that are currently running in the system/device (e.g., video streaming, cloud gaming, remotely rendered AR/VR applications, video calls, file transfers, etc.).

In some embodiments, the power budget computation system may measure a temperature of each subsystem of a device, and compute/obtain/estimate/calculate a power budget of each subsystem based on the measured temperature. In some embodiments, the power budget of a system/device may decrease as the temperature of the system/device increases. The power budget of a system/device may depend on different use cases running in the system/device. For example, for a particular use case (e.g., video call), the power budget of a Wi-Fi device or a Wi-Fi subsystem may decrease from 180 mW to 70 mW as the temperature of the Wi-Fi device or the Wi-Fi subsystem increases from 25° C. to 55° C.

In some embodiments, the power budget computation system may output a power budget of each subsystem of the device (e.g., Wi-Fi subsystem, system on chip (SOC), display, graphics subsystem, memory, etc.). Each subsystem may have different power budget. For example, for a given temperature (e.g., 30° C.), the subsystems of Wi-Fi, system on chip (SOC), graphics, display, and memory may be 150 mW, 200 mW, 100 mW, 300 mW, and 80 mW, respectively.

In one approach, a system (e.g., a power/thermal mitigation system) may perform power budget based subsystem mitigation (e.g., performing mitigation on a subsystem based on a power budget of the subsystem). In some embodiments, a power/thermal mitigation system may include a subsystem, a subsystem power estimator, and/or a mitigation value estimator. In some embodiments, each of the subsystem power estimator and the mitigation value estimator may be implemented in software, firmware, hardware, or a combination thereof. For example, the subsystem may be a Wi-Fi device or a Wi-Fi subsystem (e.g., Wi-Fi transceiver, a Wi-Fi network interface, a Wi-Fi network card, etc.), and the subsystem power estimator may be a Wi-Fi power consumption estimator 1020 in FIG. 10.

In some embodiments, the power/thermal mitigation system may perform a dynamic closed loop adjustment of power mitigation, thereby dynamically adjusting power mitigation based on (dynamic changes in) a power budget of a subsystem and/or power consumption of the subsystem. In some embodiments, the subsystem power estimator may compute/estimate a real time subsystem level power (e.g., power consumption) of the subsystem. In some embodiments, a power estimate (e.g., power consumption estimate) and a power budget may be fed/inputted to the mitigation value estimator. In some embodiments, a power budget computation system may compute/obtain/calculate/measure a power budget of the subsystem and provide/feed the power budget to the mitigation value estimator. In some embodiments, the mitigation value estimator may calculate/estimate a mitigation value (e.g., a value indicating how much power is mitigated/reduced/alleviated/adjusted) based on at least one of a power budget or a power estimate to trigger/cause the subsystem to perform a mitigation (e.g., a mitigation action) based on the mitigation value. For example, the subsystem may be a Wi-Fi device or a Wi-Fi subsystem, and the mitigation action may include at least one of throttling application data/traffic rate, reducing Wi-Fi radio transmit power, or in-device notification to users to move closer to a Wi-Fi AP. In this manner, power mitigation on a subsystem can be performed based on a subsystem power consumption which can dynamically change, thereby dynamically adjusting/updating/managing the power mitigation on the subsystem.

In some embodiments, for every epoch (e.g., every period of mitigation), the mitigation value estimator may perform the following steps. In some embodiments, the period of mitigation may be the same as the period of observation $t_{Observation}$ as shown in FIG. 8 or FIG. 9. In a first step, for a given subsystem, the mitigation value estimator may compute a power excess value of the current epoch ("current power excess (PE)") based on a power budget of the subsystem and a power (consumption) estimate of the subsystem using the following equation:

$$a\ power\ excess\ (PE) = power\ budget - power\ estimate \quad \text{(Equation 6)},$$

where the power budget is a power budget of the subsystem, and the power estimate is a power consumption value estimated by the subsystem power estimator.

In a second step, the mitigation value estimator may obtain a power excess value of the previous epoch ("previous power excess (PE)") and a mitigation value of the previous epoch ("previous mitigation value" or "Previous Mitigation Value"). The mitigation value estimator may then determine whether a change of power excess (e.g., a change from the previous PE to the current PE) is greater than a hysteresis threshold. In response to determining that the change of PE is greater than the hysteresis threshold, the mitigation value estimator may compare the current PE with 0, compare the previous mitigation value with 0, and/or compare the previous mitigation value with a maximum mitigation value. In response to determining that the current PE is greater than 0 and the previous mitigation value is less than the maximum mitigation value, the mitigation value estimator may compute/estimate/calculate the current (new) mitigation value ("New Mitigation Value") using the following equation:

$$\text{New Mitigation Value} = \quad \text{(Equation 7)}$$
$$\text{Old Mitigation Value} + \text{Delta Mitigation,}$$

where Delta Mitigation (e.g., delta mitigation value) may be a value indicating increased mitigation that can reduce power consumption of the subsystem.

In response to determining that the current PE is less than 0 and the previous mitigation value is greater than 0, the mitigation value estimator may compute/estimate/calculate the current (new) mitigation value using the following equation:

$$\text{New Mitigation Value} = \quad \text{(Equation 8)}$$
$$\text{Old Mitigation Value} - \text{Delta Mitigation}$$

In some embodiments, the delta mitigation value may indicate an increased mitigation that reduces power by K*PE where K is a scaling constant, which can be a fixed amount independent of PE. For example, for a Wi-Fi subsystem, the delta migration value may correspond to % reduction in a maximum allowed Wi-Fi Tx time that may result in reduction of power by K*PE. In some embodiments, the delta migration value can result in a fixed percentage reduction in power consumption of the subsystem.

Figure 11:
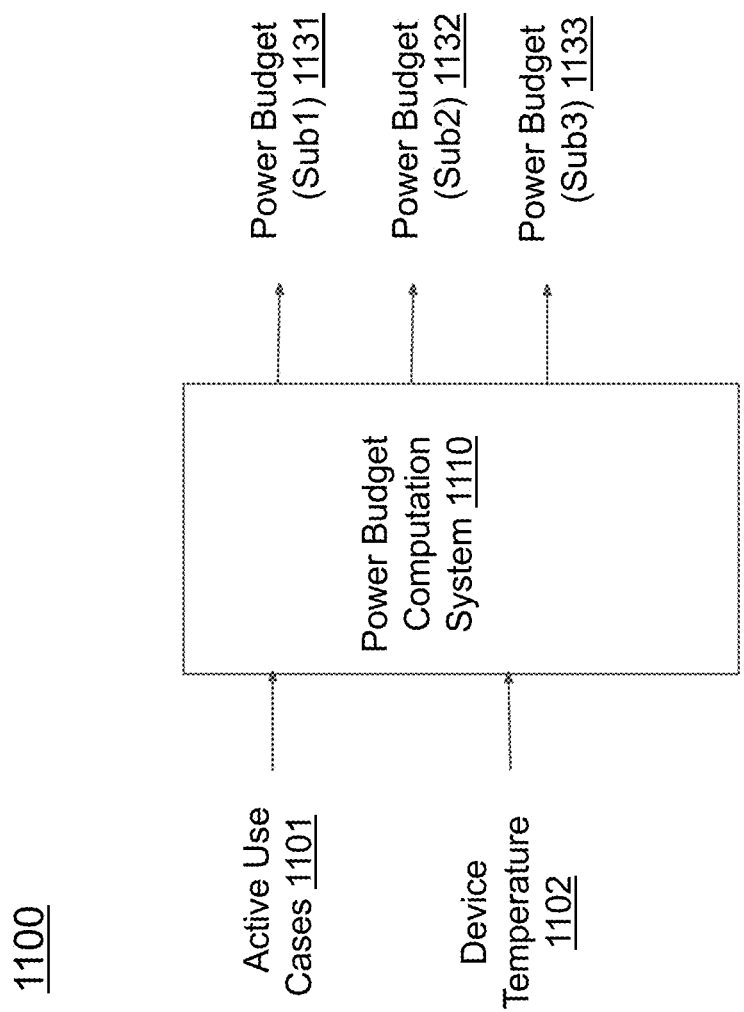
FIG. 11 is a block diagram of a power budget computation system, according to an example implementation of the present disclosure.

FIG. 11 is a block diagram 1100 of a power budget computation system 1110, according to an example implementation of the present disclosure. The power budget computation system 1110 may compute/estimate power budget of a device (e.g., battery-powered device 720, device 400) based on active use cases 1101 (e.g., applications running in the device) and a temperature 1102 of the device. The device may include a plurality of subsystems (e.g., subsystems 401, a Wi-Fi subsystem, etc.), and the power budget of the device may include a power budget of a respective subsystem of the device (e.g., power budget 1131 for subsystem 1, power budget 1132 for subsystem 2, power budget 1133 for subsystem 3). The active use cases of the system/device may refer to use cases that are currently running in the system/device (e.g., video streaming, cloud gaming, remotely rendered AR/VR applications, video calls, file transfers, etc.).

Figure 12A:
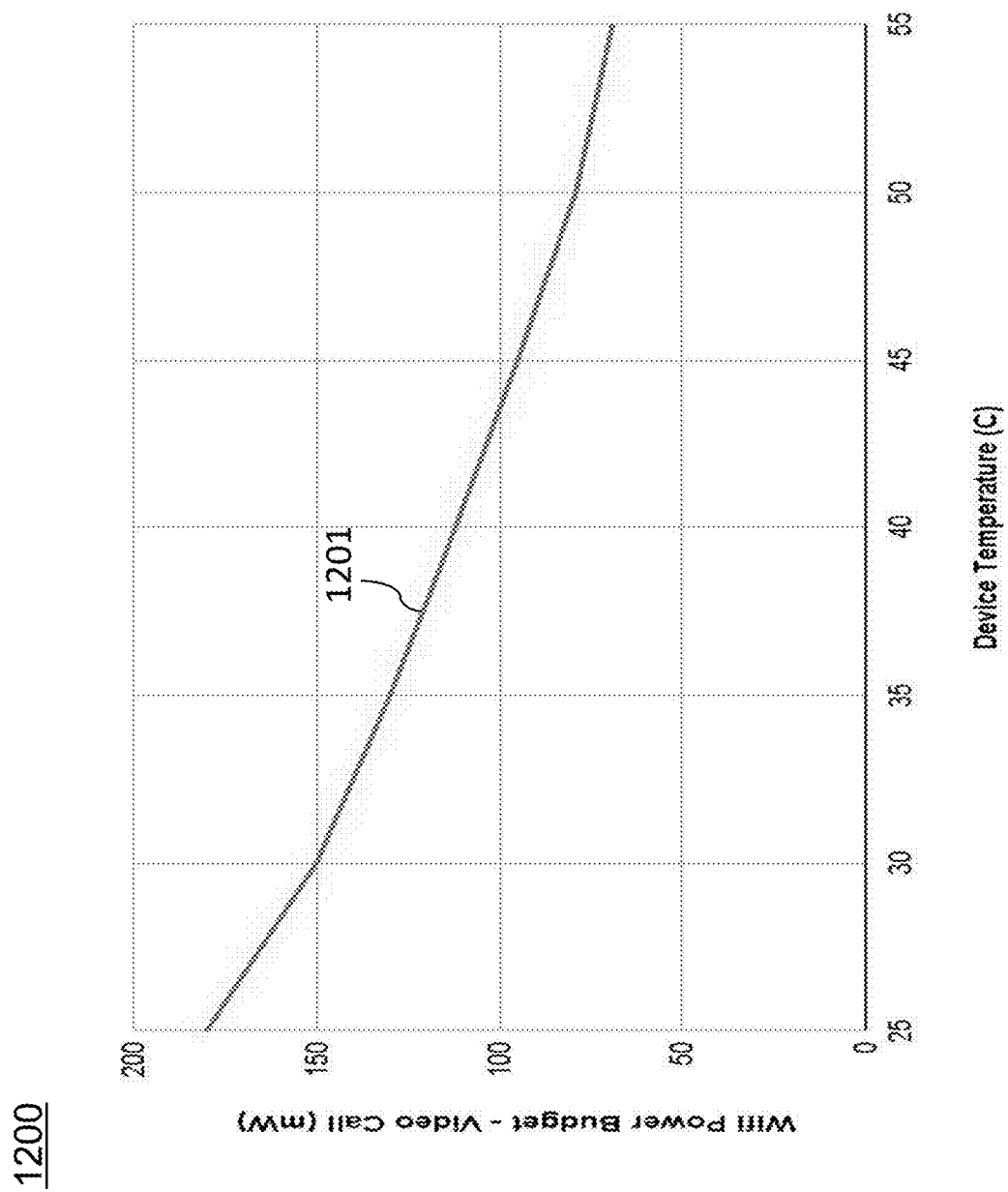
FIG. 12A is a diagram depicting example Wi-Fi power budgets over different temperatures of a device, according to an example implementation of the present disclosure.

FIG. 12A is a diagram 1200 depicting example Wi-Fi power budgets over different temperatures of a device, according to an example implementation of the present disclosure. The power budget computation system (e.g., power budget computation system 1110) may measure or input a temperature of each subsystem of a device (e.g., Wi-Fi subsystem), and compute/obtain/estimate/calculate a power budget of each subsystem (e.g., Wi-Fi subsystem) based on the measured or input temperature. The power budget of a system/device may decrease as the temperature of the system/device increases. The power budget of a system/device may depend on different use cases running in the system/device. For example, as shown in the diagram 1200, for a particular use case (e.g., video call), the power budget 1201 of a Wi-Fi device or a Wi-Fi subsystem may decrease from 180 mW to 70 mW as the temperature of the Wi-Fi device or the Wi-Fi subsystem increases from 25° C. to 55° C.

Figure 12B:
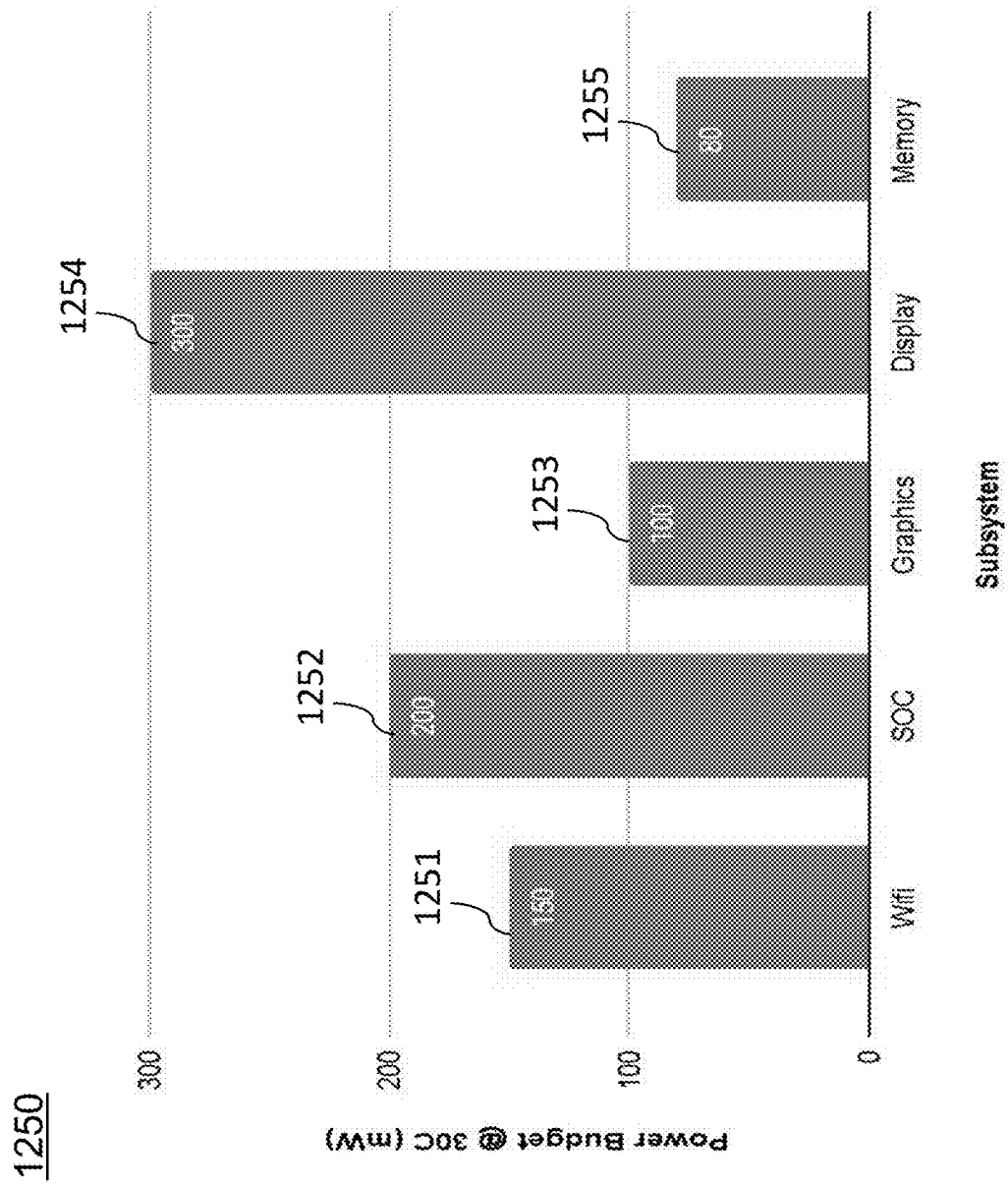
FIG. 12B is a diagram depicting example power budgets over different subsystems of a device, according to an example implementation of the present disclosure.

FIG. 12B is a diagram 1250 depicting example power budgets over different subsystems of a device, according to an example implementation of the present disclosure. The power budget computation system (e.g., power budget computation system 1110) may output a power budget of each subsystem of the device (e.g., Wi-Fi subsystem, system on chip (SOC), display, graphics subsystem, memory, etc.). Each subsystem may have different power budget. For example, for a given temperature (e.g., 30° C.), the subsystems of Wi-Fi 1251, system on chip (SOC) 1252, graphics 1253, display 1254, and memory 1255 may be 150 mW, 200 mW, 100 mW, 300 mW, and 80 mW, respectively.

Figure 13:
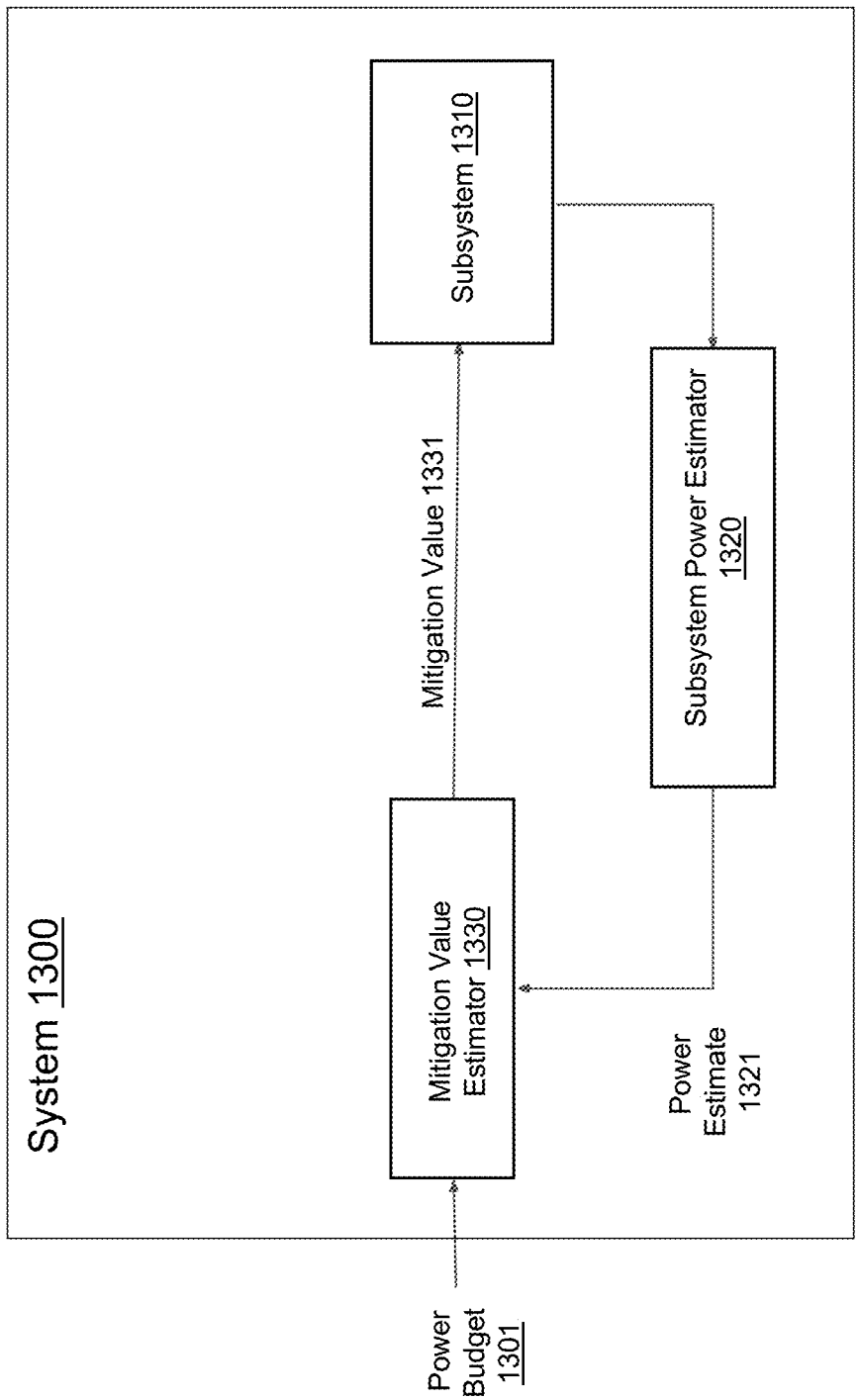
FIG. 13 is a block diagram of a system for performing power budget-based subsystem mitigations, according to an example implementation of the present disclosure.

FIG. 13 is a block diagram of a system 1300 for performing power budget-based subsystem mitigations, according to an example implementation of the present disclosure. In one approach, a system (e.g., a power/thermal mitigation system 1300) may perform power budget based subsystem mitigation (e.g., performing mitigation on a subsystem based on a power budget of the subsystem). The power/thermal mitigation system 1300 may include a subsystem 1310, a subsystem power estimator 1320, and/or a mitigation value estimator 1330. Each of the subsystem power estimator 1320 and the mitigation value estimator 1330 may be implemented in software, firmware, hardware, or a combination thereof. For example, the subsystem 1310 may be a Wi-Fi device or a Wi-Fi subsystem (e.g., Wi-Fi transceiver, a Wi-Fi network interface, a Wi-Fi network card, etc.), and the subsystem power estimator 1320 may be a Wi-Fi power consumption estimator 1020 in FIG. 10.

Referring to FIG. 13, the power/thermal mitigation system 1300 may perform a dynamic closed loop adjustment of power mitigation, thereby dynamically adjusting power mitigation based on (dynamic changes in) a power budget 1310 of the subsystem 1310 and/or power consumption (e.g., power consumption estimate 1321) of the subsystem 1310. The subsystem power estimator 1320 may compute/estimate a real time subsystem level power (e.g., power consumption estimate 1321) of the subsystem 1310. The power estimate 1321 (e.g., power consumption estimate) and the power budget 1301 may be fed/inputted to the mitigation value estimator 1330. In some embodiments, a power budget computation system (e.g., power budget computation system 1110) may compute/obtain/calculate/measure a power budget 1301 of the subsystem and provide/feed the power budget 1301 to the mitigation value estimator 1330. The mitigation value estimator 1330 may calculate/estimate a mitigation value (e.g., a value indicating how much power is mitigated/reduced/alleviated/adjusted) based on at least one of the power budget 1301 or the power estimate 1321 to trigger/cause the subsystem 1310 to perform a mitigation (e.g., a mitigation action) based on the mitigation value. For example, the subsystem 1310 may be a Wi-Fi device or a Wi-Fi subsystem, and the mitigation action may include at least one of throttling application data/traffic rate, reducing Wi-Fi radio transmit power, or in-device notification to users to move closer to a Wi-Fi AP. In this manner, power mitigation on a subsystem can be performed based on a subsystem power consumption which can dynamically change, thereby dynamically adjusting/updating/managing the power mitigation on the subsystem.

In some embodiments, for every epoch (e.g., every period of mitigation), the mitigation value estimator 1330 may perform the following steps. The period of mitigation may be the same as the period of observation $t_{Observation}$ 810 or 910 as shown in FIG. 8 or FIG. 9. In a first step, for a given subsystem, the mitigation value estimator 1330 may compute a power excess value of the current epoch ("current power excess (PE)") based on a power budget of the subsystem 1310 and a power (consumption) estimate of the subsystem 1310 using the Equation 6.

In a second step, the mitigation value estimator 1330 may obtain a power excess value of the previous epoch ("previous power excess (PE)") and a mitigation value of the previous epoch ("previous mitigation value" or "Previous Mitigation Value"). The mitigation value estimator 1330 may then determine whether a change of power excess (e.g., a change from the previous PE to the current PE) is greater than a hysteresis threshold. In response to determining that the change of PE is greater than the hysteresis threshold, the mitigation value estimator 1330 may compare the current PE with 0, compare the previous mitigation value with 0, and/or compare the previous mitigation value with a maximum mitigation value. In response to determining that the current PE is greater than 0 and the previous mitigation value is less than the maximum mitigation value, the mitigation value estimator 1330 may compute/estimate/calculate the current (new) mitigation value ("New Mitigation Value") using Equation 7 by adding the Previous Mitigation Value and a delta mitigation value which is a value indicating increased mitigation that can reduce power consumption of the subsystem. In response to determining that the current PE is less than 0 and the previous mitigation value is greater than 0, the mitigation value estimator 1330 may compute/estimate/calculate the current (new) mitigation value using Equation 8 by subtracting the delta mitigation value from the Previous Mitigation Value.

In some embodiments, the delta mitigation value may indicate an increased mitigation that reduces power by K*PE where K is a scaling constant, which can be a fixed amount independent of PE. For example, for a Wi-Fi subsystem, the delta migration value may correspond to % reduction in a maximum allowed Wi-Fi Tx time that may result in reduction of power by K*PE. In some embodiments, the delta migration value can result in a fixed percentage reduction in power consumption of the subsystem.

4. Advantages and Benefits

Embodiments in the present disclosure have at least the following advantages and benefits.

First, embodiments in the present disclosure can provide useful techniques for estimation of Wi-Fi power consumption which may not be predicated on the presence of a dedicated module to measure/monitor Wi-Fi power consumption, thereby being non-invasive and/or nonintrusive. For example, an average Wi-Fi power consumption of a battery-powered wireless device may be determined/estimated/calculated/monitored based on total times of Tx, Rx, listen state, and/or sleep state during a period of observation, when running a use case/application (e.g., during the runtime or in real time). In this manner, estimation of Wi-Fi power consumption can be in-device (e.g., estimation can be performed in a device, or estimation mechanism can be integrated in a device), dynamic, non-invasive, and/or nonintrusive (e.g., estimation can be done without significant impacts (or with a minimal impact) on performance or operations of the device).

Second, embodiments in the present disclosure can provide useful techniques for performing power mitigation on a subsystem based on a subsystem power consumption which can dynamically change, thereby dynamically adjusting/updating/managing the power mitigation on the subsystem. For example, a mitigation value estimator may calculate/estimate a mitigation value (e.g., a value indicating how much power is mitigated/reduced/alleviated/adjusted) based on at least one of a power budget or a power estimate to trigger/cause the subsystem to perform a mitigation (e.g., a mitigation action) based on the mitigation value.

5. Flow Diagrams

Figure 14:
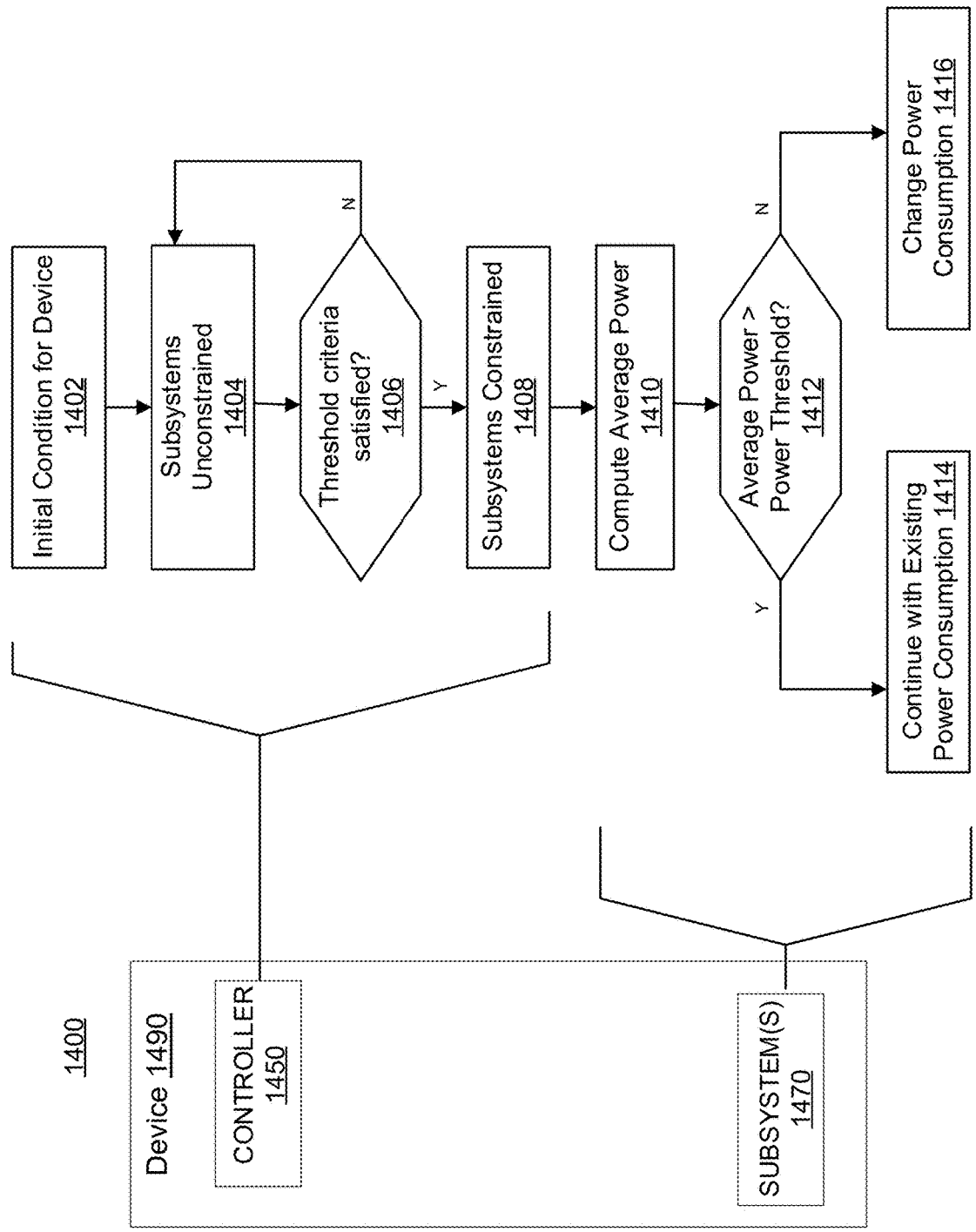
FIG. 14 is a flowchart showing a method for managing power consumption of device subsystems, according to an example implementation of the present disclosure.

FIG. 14 is a flowchart showing a method for managing power consumption of device subsystems, according to an example implementation of the present disclosure. Referring now to FIG. 14, depicted is a flowchart showing a method 1400 of managing power consumption of device subsystems, according to an example implementation of the present disclosure. As shown in FIG. 14, some steps (e.g., steps 1402-1408) may be performed by a controller 1450 of a device 1490, while other steps (e.g., steps 1410-1416) may be performed by respective subsystems 1470 at the subsystem 1470 level. The device 1490 may be a Wi-Fi device (e.g., HWD 150, battery-powered device 720) or any device (e.g., device 400, console 120, computing system 314). In some embodiments, the controller 1450 may include an operating system (e.g., the operating system 416 in the device 400) or a controller in the operating system (e.g., the controller 418 in the device 400). In some embodiments, the controller 1450 may include at least one of a Wi-Fi power consumption estimator (e.g., Wi-Fi power consumption 1020), a power budget computation system (e.g., power budget computation system 1110), a subsystem power estimator (e.g., subsystem power estimator 1320), or a mitigation value estimator (e.g., mitigation value estimator 1330). In some embodiments, the subsystems 1470 may include a Wi-Fi device (e.g., HWD 150), a Wi-Fi subsystem (e.g., Wi-Fi network interface 320), Wi-Fi firmware (e.g., Wi-Fi firmware 1030), or any subsystem (e.g., subsystem 401, subsystem 1310). In some embodiments, the subsystems 1470 may include at least one of a Wi-Fi power consumption estimator (e.g., Wi-Fi power consumption 1020), a power budget computation system (e.g., power budget computation system 1110), a subsystem power estimator (e.g., subsystem power estimator 1320), or a mitigation value estimator (e.g., mitigation value estimator 1330).

As a brief overview, at step 1402, the controller 1450 determines an initial condition for the device 1490. At step 1404, the subsystems 1470 operate at an unconstrained level. At step 1406, the controller 1450 determines whether a threshold criteria is satisfied/reached. At step 1408, the subsystems 1470 operate at a constrained level (e.g., responsive to the threshold criteria being satisfied/reached). At step 1410, the subsystems 1470 compute an average power. At step 1412 (which may be part of step 1408), the subsystems 1470 determine whether their average power exceeds a power threshold. If no, the subsystems may continue with their existing power consumption (step 1414, which may be part of or a result of step 1408). If yes, the subsystems can change 1470 their power consumption (step 1416, which may be part of or a result of step 1408).

At step 1402, the controller 1450 determines a condition for the device 1490. In some embodiments, the controller 1450 determines a condition for the device 1490 while the device 1490 executes an application (e.g., application 414, application 1010). The controller 1450 may determine the condition while the device (e.g., at step 1404) operates at an unconstrained level. In other words, step 1402 and step 1404 may be performed at the same time, simultaneously, at overlapping (or partially overlapping) time periods, etc. In some embodiments, the controller 1450 may determine the condition using various sensor measurement(s) of the device 1490. For example, the condition may be a power consumption of or across the device 1490 (e.g., across the subsystems 1470 of the device 400) over a time period, a thermal output or condition of the device 1490, etc. as the device 1490 executes/supports the application. In other words, the condition may be or include a subsystem-wide (or total) power consumption level of the device 1490 and/or a temperature or thermal output of the device 1490. The controller 1450 may determine the condition based on, according to, or using sensor data from one or more sensors of the device 1490 (e.g., power measurement sensor(s), thermal/temperature sensor(s), etc.). In some embodiments, the controller 1450 may determine the condition at various intervals. For example, the controller 1450 may periodically determine the condition of the device 1490 while the device 1490 executes an application (e.g., application 414, application 1010). In some embodiments, the controller 1450 is part of an operating system (e.g., operating system 416) for the device or includes the operating system. In other words, the controller 1450 may be implemented or otherwise provided at the operating system-level.

At step 1406, the controller 1450 determines whether a threshold criteria is satisfied. In some embodiments, the controller 1450 may determine to operate the device 1490 at a reduced power level for a first application, based on the condition (e.g., identified at step 1402) for the device 1490 satisfying at least one threshold criteria. The controller 1450 may determine/project that the threshold criteria is satisfied by the condition responsive to, for example, the temperature/thermal output/power consumption exceeding (or being equal to) a thermal or power threshold of a thermal threshold criteria or a power threshold criteria when/if the device 1490 (e.g., each of the subsystems 401 of the device 400) operates at a full power level or otherwise at an unconstrained level (e.g., at step 1404). The controller 1450 may maintain a thermal threshold and/or a power threshold for the device 1490. The controller 1450 may compare the (e.g., actual/determined/projected) condition of the device 1490 (e.g., identified at step 1402) to the thermal threshold and/or power threshold as the subsystems 1470 of the device 1490 executing/operating in an unconstrained manner (e.g., operate at full utilized/consumed power).

In some embodiments, the threshold criteria may be satisfied responsive to either (e.g., any) threshold of the power threshold or thermal threshold being exceeded by the corresponding device power or device thermal condition. If at step 1406, the controller 1450 determines that the threshold criteria is not satisfied/reached (e.g., device power consumption is less than the device power threshold or the device thermal condition is less than the device thermal threshold), the method 1400 may proceed back to step 1404 (e.g., where the subsystems 1470 operate in an unconstrained manner). On the other hand, if at step 1406, the controller 1450 determines that the threshold criteria is satisfied, the method 1400 may proceed to step 1408.

At step 1408, at least some of the subsystems 1470 may (be caused/configured to) operate at a constrained level (e.g., responsive to the threshold criteria being satisfied/reached, for example a power/thermal threshold being exceeded). In some embodiments, the controller 1450 may determine a constraint metric to apply responsive to determining to operate at the reduced power level. In some embodiments, the controller 1450 may determine the constraint metric based on the difference between the threshold and the condition (e.g., the difference between the device power consumption level and device power threshold, or the difference between the device thermal/temperature condition and device temperature threshold). In some embodiments, the constraint metric may be inversely proportional to the difference. For example, as the difference increases positively (e.g., device power consumption level increases beyond the device power threshold), the controller 1450 may proportionally reduce/tighten (the value of) the constraint metric. The controller 1450 may apply the constraint metric responsive to determining to operate at the reduced power level. The controller 1450 may apply the constraint metric by setting a value used by each of the subsystems 1470 for selectively adjusting their power consumption level. The controller 1450 may apply the constraint metric agnostic to the individual subsystems 1470. For example, the controller 1450 may apply the constraint metric or value that is global (e.g., device wide) to each of the subsystems 1470, and the subsystems 1470 may use the global constraint metric to adjust their power consumption. In at least some of these embodiments, the constraint metric may be a device-wide value set by the controller 1450, and can be used by at least some of the subsystems 1470 in connection with a particular constraint metric table corresponding to an application executing on the device for adjusting a power consumption of the subsystem 1470.

In some embodiments, the controller 1450 may set, identify, or otherwise determine the constraint metric based on the application executing, deployed, or otherwise supported by the device 400. For example, the controller 1450 may include one or more constraint metrics to be used for different applications or application types of applications executable on the device. The constraint metrics may be pre-calibrated or otherwise pre-configured for the application (e.g., to throttle or otherwise reduce power consumption at the subsystem level). The controller 1450 may determine the application (or application type for the application) executing on the device, and select the constraint metric which corresponds to the application/application type.

In some embodiments, the controller 1450 may set, identify, or otherwise determine the constraint metric based on a difference between the condition of the device and a corresponding threshold. The controller 1450 may compute the constraint metric based on the condition of the device 1490 separate from or agnostic to the application which is executing on the device 400. In other words, while the device 1490 executes or otherwise is deploying an application, the controller 1450 may determine a condition of the device, and use the condition for determining or computing the constraint metric. However, the controller 1450 may not consider the application (or application type) as part of determining the constraint metric. The controller 1450 may set the constraint metric for each of the subsystems and provide (e.g., separately or in connection with setting the constraint metric) an indication of the application (or application type of the application) executing on the device 1490. In this sense, the constraint metric may be a value or index used by the subsystems 1470 for selectively adjusting their power consumption level using the constraint metric and constraint metric table which corresponds to the application/application type of the application executing on the device.

In some embodiments, the controller 1450 may apply the constraint metric by transmitting, sending, or otherwise providing the constraint metric to each of the subsystems 1470 of the device 1490. In some embodiments, the device 400 may access, include, or otherwise maintain one or more constraint metric tables for applications which are executable/supported on the device 1490. For instance, the application may execute on the device 1490 (e.g., on a CPU of the device 400), be fully or partially provisioned to the device from one or more remote sources, or may otherwise be executable on, supported by, or otherwise provided by the device 1490. The constraint metric tables may specify respective power levels for subsystems 1470 of the device 400. The constraint metric tables may be specific to a respective application or application type of application(s) executable on the device 1490. In some embodiments, the device 1490 may maintain an application-specific constraint metric table which may be used for a specific/individual application. In some embodiments, the device 400 may maintain an application type-specific constraint metric table which may be used for several applications (e.g., applications 414) having/sharing or characterized by a common application type. For example, as described above with reference to FIG. 5A-FIG. 5C, the device 400 may maintain several constraint metric tables for different applications/application types. The constraint metric tables may specify power levels at different constraint metrics (e.g., constraint metric values) for different subsystems 401. The power levels may be precalibrated or otherwise preconfigured for each of the subsystems 401, for different applications/application types. For example, assuming the same constraint metric is applied at two points in time for two different applications (e.g., one application 414 executing at one time, and subsequently a different application 414 executing later on at a different time), a given subsystem 401 may have a different power level (or power threshold level) based on the different applications 414 respectively executing on the device 400 at different times. In other words, the device 400 may maintain a first constraint metric table which specifies a first power level for a subsystem for a first application 414 and a second constraint metric table which specifies a second power level for the same subsystem for a second application 414.

As described in greater detail below, the subsystems 1470 of the device 1490 may selectively modify their respective power consumption level using the constraint metric and a constraint metric table corresponding to the application executing on the device 1490. The subsystems 1470 may each identify the constraint metric table (e.g., from the one or more constraint metric tables maintained by the device 400) which corresponds to an application (e.g., application 414) which is executing/operating/supported on the device 1490. In some embodiments, the subsystems 1470 may identify the constraint metric table responsive to receiving the constraint metric from the controller 1450. In some embodiments, the subsystems 1470 may identify the constraint metric table responsive to the application being launched (e.g., by the user of the device 400), and/or the constraint metric. The subsystems 1470 may identify the constraint metric table using a look-up of an application name/application identifier for the application, using tags of the application, etc. as described above.

At step 1410, the subsystems 1470 can compute an average power. In some embodiments, a first subsystem 1470 computes an average/peak/instantaneous power (e.g., an average/peak/instantaneous power consumption) for the first subsystem 1470. In some embodiments, the first subsystem 1470 may compute an average power of the first subsystem 1470 over a time period (e.g., a number of seconds, minutes, etc.). The first subsystem 1470 may compute the average power of the first subsystem 1470 using a current draw and voltage level of the first subsystem 1470 over the time period. It is noted that, while hereinafter described as a first subsystem 1470, each of the subsystems 1470 may separately (e.g., in parallel/simultaneously/etc.) perform steps 1410-1416.

At step 1412, the subsystems 1470 can determine whether their average/peak/instantaneous power exceeds a power threshold. In some embodiments, the first subsystem 1470 may identify a power threshold which corresponds to the first subsystem 1470 and the constraint metric (e.g., set by the controller at step 1408 as described above). For example, the first subsystem 1470 may identify the power threshold by performing a look-up in the identified constraint metric table that corresponds to the application 414 executing on the device 400. The first subsystem 1470 may perform the look-up using the constraint metric set by the controller 1450 and an identifier for the first subsystem 1470, to identify the power level which corresponds to the first subsystem 1470. The first subsystem 1470 may compare the average/peak/instantaneous power (e.g., determined at step 1410 for the first subsystem 1470) to the threshold power level from the constraint metric table.

If at step 1412, the average/peak/instantaneous power is within (e.g., is less than or equal to) the threshold power level from the constraint metric table for the first subsystem, the first subsystem 1470 may continue operation with the existing power consumption or without constraint on its power consumption (step 1414). In this regard, the first subsystem 1470 may determine that a current power consumption level is within the power level for the first subsystem specified in the constraint metric table. On the other hand, if at step 1412, the average/peak/instantaneous power is outside (e.g., is greater than) the threshold power level from the constraint metric table for the first subsystem, the first subsystem 1470 may change, alter, update, reduce, constraint or otherwise modify the power consumption level according to the threshold power level specified in the constraint metric table for the first subsystem 1470 (step 1416). In some embodiments, each subsystem 1470 may modify their respective power consumption level in a different manner according to functions performed by the respective subsystem 1470.

As noted above, each of the subsystems 1470 may perform the steps 1410-1416 responsive to the controller 1450 setting/assigning/communicating a constraint metric. Since the constraint metric tables specify different power levels for each of the subsystems 1470 depending on the application/application type of the application executing on the device 1490, the subsystems 1470 may be impacted to a different degree. For instance, a given constraint metric may cause a first subsystem 1470 of the device 1490 to adjust a power consumption level of the first subsystem to a different degree (e.g., percentage, or absolute amount) than a second subsystem 1470 of the device, depending on the application executing on the device. For example, one subsystem 1470 may bypass adjustment of a power consumption level of the subsystem 1470 based on the constraint metric and the corresponding power level from the constraint metric table for the application, where another subsystem 1470 may reduce their power consumption level based on the same constraint metric (since the subsystem 1470 in this example would have a power consumption level which exceeds the power level from the constraint metric table).

Figure 15:
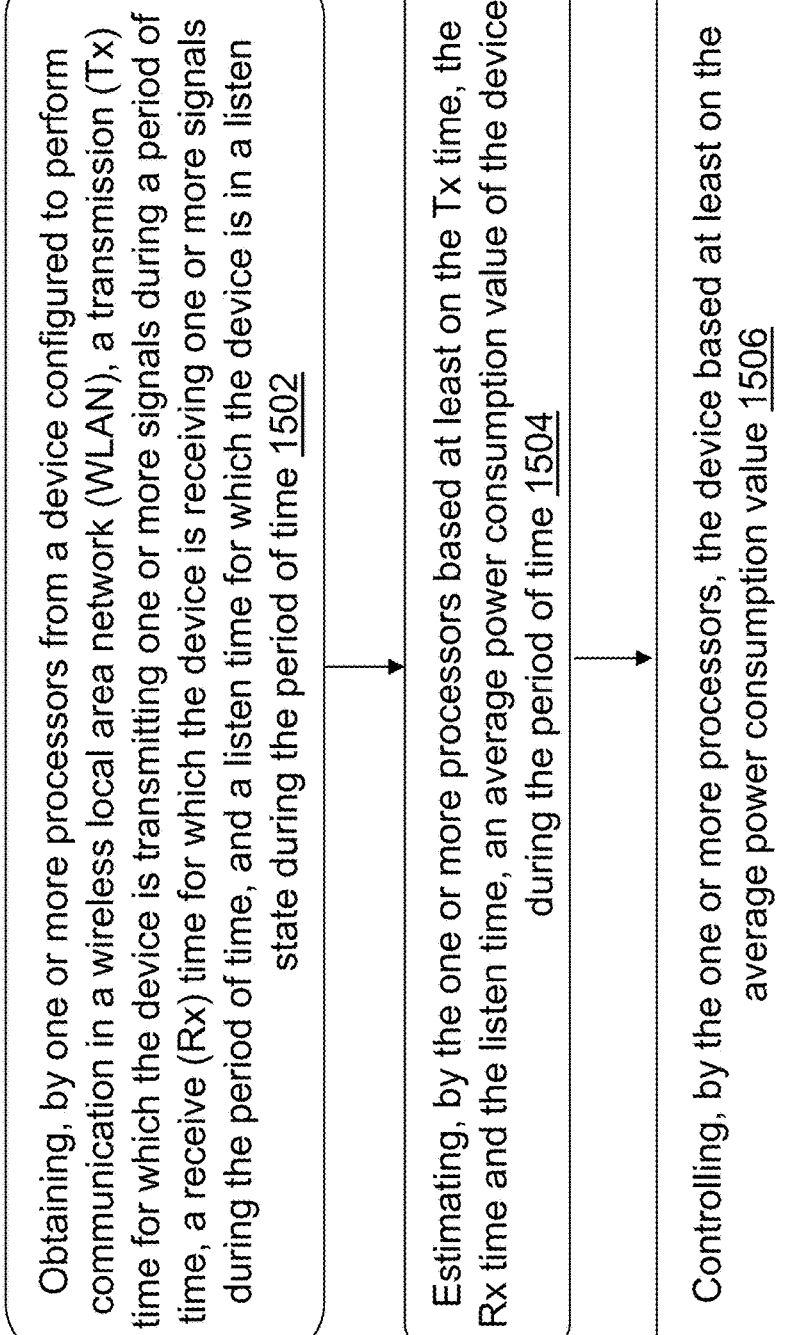
FIG. 15 is a flowchart showing a method for estimation of power consumption of a device, according to an example implementation of the present disclosure.

FIG. 15 is a flowchart showing a process 1500 for estimation of power consumption of a device, according to an example implementation of the present disclosure. In some embodiments, the process 1500 is performed by one or more processors (e.g., one or more processors of console 120, HWD 150, device 400, battery powered device 720, system/device 1000, power budget computation system 1110, power/thermal mitigation system 1300, or any computing system 314). In some embodiments, the process 1500 is performed by other entities. In some embodiments, the process 1500 includes more, fewer, or different steps than shown in FIG. 15.

In one approach, the one or more processors may obtain 1502, from a device (e.g., battery powered device 720) configured to perform communication in a wireless local area network (WLAN), a transmission (Tx) time (e.g., $t_{Tx}$) for which the device is transmitting one or more signals during a period of time (e.g., $t_{Observation}$ 810), a receive (Rx) time (e.g., $t_{Rx}$) for which the device is receiving one or more signals during the period of time (e.g., $t_{Observation}$ 810), and a listen time (e.g., Listen) for which the device is in a listen state during the period of time (e.g., $t_{Observation}$ 810). In some embodiments, the Tx time, the Rx time and the listen time may be a total Tx time, a total Rx time and a total listen time, during the period of time (e.g., $t_{Observation}$ 810), respectively.

In one approach, the one or more processors may estimate 1504, based at least on the Tx time (Tx, the Rx time try and the listen time $t_{Listen}$, an average power consumption value of the device during the period of time (e.g., $t_{Observation}$ 810). In some embodiments, in estimating the average power consumption value of the device during the period of time, the one or more processors may obtain a Tx power consumption value (e.g., $P_{Tx}$) of the device in a Tx state, an Rx power consumption value (e.g., $P_{Rx}$) of the device in an Rx state, and a listen power consumption value (e.g., $P_{Listen}$) of the device in the listen state. The one or more processors may multiply the Tx time, the Rx time and the listen time by the Tx power consumption value, the Rx power consumption value and the listen power consumption value, respectively (e.g., using Equation 2). The one or more processors may obtain the Tx power consumption value based on at least one of a Tx power level, a channel bandwidth, a modulation-and-coding scheme (MCS) index, or a number of spatial streams (NSS). The one or more processors may obtain the Rx power consumption value based on at least one of the channel bandwidth, or the NSS. The one or more processors may obtain the listen power consumption value based on the channel bandwidth.

In some embodiments, the one or more processors may obtain, from the device, a sleep time (e.g., $t_{Sleep}$) for which the device is in a power-save state during the period of time (e.g., $t_{Observation}$ 910). The one or more processors may estimate, based at least on the Tx time (e.g., $t_{Tx}$), the Rx time (e.g., (Rx), the listen time (e.g., $t_{Listen}$) and the sleep time (e.g., $t_{Sleep}$), the average power consumption value of the device during the period of time (e.g., $t_{Observation}$ 910). For example, the one or more processors may multiply the Tx time, the Rx time, the listen time, the sleep time by the Tx power consumption value, the Rx power consumption value, the listen power consumption value, and a sleep power consumption value, respectively (e.g., using Equation 5).

In some embodiments, the one or more processors (e.g., Wi-Fi power consumption estimator 1020 of the system/device 1000) may periodically obtain, from the device (e.g., Wi-Fi firmware 1030 of the system/device 1000), a Tx time, an Rx time and a listen time (e.g., at step 1002 and step 1003). The one or more processors may estimate, based at least on the Tx time, the Rx time and the listen time periodically obtained from the device, an average power consumption value of the device (e.g., at step 1004).

In one approach, the one or more processors may control 1506 the device based at least on the average power consumption value. In some embodiments, in controlling the device, the one or more processors (e.g., subsystem 1470) may compare the average power consumption with a threshold (e.g., at step 1412). The one or more processors may perform, according to a result of the comparing (e.g., if the average power consumption is greater than the threshold), a mitigation action on the device to reduce power consumption of the device (e.g., changing power consumption at step 1416).

In some embodiments, in controlling the device, the one or more processors (e.g., power budget computation system 1110) may estimate, according to a temperature of the device (e.g., device temperature 1102) during the period of time, a power budget of the device (e.g., power budget 1131, 1132, 1133). The one or more processors (e.g., mitigation value estimator 1330) may calculate, based on the power budget (e.g., power budget 1301) and the estimated average power consumption value (e.g., power estimate 1321), a current power excess (PE) value (e.g., PE value of the current epoch). For example, the mitigation value estimator 1330 may calculate the current PE value using Equation 6.

The one or more processors (e.g., mitigation value estimator 1330) may obtain a previous PE value (e.g., PE value of the previous epoch) and a previous mitigation value indicating a degree of reducing power consumption of the device. The one or more processors may calculate a current mitigation value based at least on the current PE value, the previous PE value, and the previous mitigation value. In calculating the current mitigation value, responsive to determining that the current PE value is greater than 0 and the previous mitigation value is smaller than a predetermined mitigation value, the one or more processors may calculate the current mitigation value by adding a first value (e.g., delta mitigation value) to the previous mitigation value (e.g., using Equation 6). Responsive to determining that the current PE value is smaller than 0 and the previous mitigation value is greater than 0, the one or more processors may calculate the current mitigation value by subtracting the first value (e.g., delta mitigation value) from the previous mitigation value (e.g., using Equation 7). The first value may indicate reducing power consumption of the device by a scaling constant times the current PE value (e.g., K*PE where K is a scaling constant, which can be a fixed amount independent of PE). The one or more processors may perform, according to the current mitigation value, a mitigation action on the device to reduce power consumption of the device. The mitigation action may include at least one of throttling an application data rate, throttling a traffic rate, reducing a radio Tx power, or notifying a user of the device to move closer to an access point.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system comprising:
one or more processors configured to:
obtain, from a device configured to perform communication in a wireless local area network (WLAN), a transmission (Tx) time for which the device is transmitting one or more signals during a period of time, a receive (Rx) time for which the device is receiving one or more signals during the period of time, and a listen time for which the device is in a listen state during the period of time;
estimate, based at least on the Tx time, the Rx time and the listen time, an average power consumption value of the device during the period of time; and
control the device based at least on the average power consumption value.

2. The system of claim 1, wherein the Tx time, the Rx time and the listen time are a total Tx time, a total Rx time and a total listen time, during the period of time, respectively.

3. The system of claim 1, wherein in estimating the average power consumption value of the device during the period of time, the one or more processors are configured to:
obtain a Tx power consumption value of the device in a Tx state, an Rx power consumption value of the device in an Rx state, and a listen power consumption value of the device in the listen state; and multiply the Tx time, the Rx time and the listen time by the Tx power consumption value, the Rx power consumption value and the listen power consumption value, respectively.

4. The system of claim 3, wherein the one or more processors are configured to:
obtain the Tx power consumption value based on at least one of a Tx power level, a channel bandwidth, a modulation-and-coding scheme (MCS) index, or a number of spatial streams (NSS);
obtain the Rx power consumption value based on at least one of the channel bandwidth, or the NSS; and
obtain the listen power consumption value based on the channel bandwidth.

5. The system of claim 1, wherein the one or more processors are configured to:
obtain, from the device, a sleep time for which the device is in a power-save state during the period of time; and
estimate, based at least on the Tx time, the Rx time, the listen time and the sleep time, the average power consumption value of the device during the period of time.

6. The system of claim 1, wherein the one or more processors are configured to:
periodically obtain, from the device, a Tx time, an Rx time and a listen time; and
estimate, based at least on the Tx time, the Rx time and the listen time periodically obtained from the device, an average power consumption value of the device.

7. The system of claim 1, wherein in controlling the device, the one or more processors are configured to:
compare the average power consumption with a threshold; and
perform, according to a result of the comparing, a mitigation action on the device to reduce power consumption of the device.

8. The system of claim 7, wherein the mitigation action comprises at least one of throttling an application data rate, throttling a traffic rate, reducing a radio Tx power, or notifying a user of the device to move closer to an access point.

9. The system of claim 1, wherein in controlling the device, the one or more processors are configured to:
estimate, according to a temperature of the device during the period of time, a power budget of the device;
calculate, based on the power budget and the estimated average power consumption value, a current power excess (PE) value;
obtain a previous PE value and a previous mitigation value indicating a degree of reducing power consumption of the device;
calculate a current mitigation value based at least on the current PE value, the previous PE value, and the previous mitigation value; and
perform, according to the current mitigation value, a mitigation action on the device to reduce power consumption of the device.

10. The system of claim 9, wherein in calculating the current mitigation value, the one or more processors are configured to:
responsive to determining that the current PE value is greater than 0 and the previous mitigation value is smaller than a predetermined mitigation value, calculate the current mitigation value by adding a first value to the previous mitigation value; and responsive to determining that the current PE value is smaller than 0 and the previous mitigation value is greater than 0, calculate the current mitigation value by subtracting the first value from the previous mitigation value,
wherein the first value indicates reducing power consumption of the device by a scaling constant times the current PE value.

11. A method comprising:
obtaining, by one or more processors from a device configured to perform communication in a wireless local area network (WLAN), a transmission (Tx) time for which the device is transmitting one or more signals during a period of time, a receive (Rx) time for which the device is receiving one or more signals during the period of time, and a listen time for which the device is in a listen state during the period of time;
estimating, by the one or more processors based at least on the Tx time, the Rx time and the listen time, an average power consumption value of the device during the period of time; and
controlling, by the one or more processors, the device based at least on the average power consumption value.

12. The method of claim 11, wherein the Tx time, the Rx time and the listen time are a total Tx time, a total Rx time and a total listen time, during the period of time, respectively.

13. The method of claim 11, wherein estimating the average power consumption value of the device during the period of time comprises:
obtaining a Tx power consumption value of the device in a Tx state, an Rx power consumption value of the device in an Rx state, and a listen power consumption value of the device in the listen state; and
multiplying the Tx time, the Rx time and the listen time by the Tx power consumption value, the Rx power consumption value and the listen power consumption value, respectively.

14. The method of claim 13, comprising:
obtaining the Tx power consumption value based on at least one of a Tx power level, a channel bandwidth, a modulation-and-coding scheme (MCS) index, or a number of spatial streams (NSS);
obtaining the Rx power consumption value based on at least one of the channel bandwidth, or the NSS; and
obtaining the listen power consumption value based on the channel bandwidth.

15. The method of claim 11, comprising:
obtaining, from the device, a sleep time for which the device is in a power-save state during the period of time; and
estimating, based at least on the Tx time, the Rx time, the listen time and the sleep time, the average power consumption value of the device during the period of time.

16. The method of claim 11, comprising:
periodically obtaining, from the device, a Tx time, an Rx time and a listen time; and
estimating, based at least on the Tx time, the Rx time and the listen time periodically obtained from the device, an average power consumption value of the device.

17. The method of claim 11, wherein controlling the device comprises:
comparing the average power consumption with a threshold; and performing, according to a result of the comparing, a mitigation action on the device to reduce power consumption of the device.

18. The method of claim 17, wherein the mitigation action comprises at least one of throttling an application data rate, throttling a traffic rate, reducing a radio Tx power, or notifying a user of the device to move closer to an access point.

19. The method of claim 11, wherein controlling the device comprises:
   estimating, according to a temperature of the device during the period of time, a power budget of the device;
   calculating, based on the power budget and the estimated average power consumption value, a current power excess (PE) value;
   obtaining a previous PE value and a previous mitigation value indicating a degree of reducing power consumption of the device;
   calculating a current mitigation value based at least on the current PE value, the previous PE value, and the previous mitigation value; and
   performing, according to the current mitigation value, a mitigation action on the device to reduce power consumption of the device.

20. The method of claim 19, wherein calculating the current mitigation value comprises:
   responsive to determining that the current PE value is greater than 0 and the previous mitigation value is smaller than a predetermined mitigation value, calculating the current mitigation value by adding a first value to the previous mitigation value; and
   responsive to determining that the current PE value is smaller than 0 and the previous mitigation value is greater than 0, calculating the current mitigation value by subtracting the first value from the previous mitigation value,
   wherein the first value indicates reducing power consumption of the device by a scaling constant times the current PE value.

* * * * *